(12) United States Patent
Holscher et al.

(10) Patent No.: US 6,386,142 B1
(45) Date of Patent: May 14, 2002

(54) MODULAR BIRDING ACCESSORY POLE AND ASSOCIATED BIRDING ACCESSORIES

(75) Inventors: Joseph Holscher, Fowler; James R. Carpenter, Zionsville, both of IN (US)

(73) Assignees: Wild Birds Unlimited, Inc., Carmel; Holscher Products, Inc., Fowler, both of IN (US)

( * ) Notice: Subject to any disclaimer, the term of this patent is extended or adjusted under 35 U.S.C. 154(b) by 0 days.

(21) Appl. No.: 09/599,668

(22) Filed: Jun. 22, 2000

Related U.S. Application Data

(60) Provisional application No. 60/140,891, filed on Jun. 24, 1999.

(51) Int. Cl.$^7$ ............................................... A01K 61/02
(52) U.S. Cl. ..................... 119/57.8; 119/68; 119/51.01
(58) Field of Search ......................... 119/57.8, 68, 708, 119/52.1, 52.2, 63, 57.9, 52.3, 51.01

(56) References Cited

U.S. PATENT DOCUMENTS

| | | | |
|---|---|---|---|
| 2,715,386 A | * | 8/1955 | Jones |
| 5,044,319 A | * | 9/1991 | Blasbalg |
| 5,095,847 A | * | 3/1992 | Coffer |
| 5,195,460 A | * | 3/1993 | Loken |
| 5,289,796 A | * | 3/1994 | Armstrong |
| 5,435,268 A | * | 7/1995 | Liethen |
| 5,533,467 A | * | 7/1996 | Lancia |

OTHER PUBLICATIONS

Erva Zone 2 Catalog and Price List, 1998, Erva Tool and Die Co., Chicago, Illinois 60622–4324.
Green Esteem 1999 Catalog No. 3, Birdfeeding and Gardening Accessories, Hiatt Mfg., Inc., Winoma MN 55987.
Marker's Inc., 1999 Holes 'n' Poles Catalog, Marker's Inc., Avon Lake, Ohio 44012.

Blacksmith Series, 1998, Blacksmith Series Coreline, 1–765–869–4033.

Holscher Products, Inc. 1998 Catalog, Holscher Products, Inc. Fowler, Indiana 47944.

* cited by examiner

*Primary Examiner*—Charles T. Jordan
*Assistant Examiner*—Judith A. Nelson
(74) *Attorney, Agent, or Firm*—E. Victor Indiano

(57) ABSTRACT

A modular pole system for birding includes different modules to allow the birder to custom design their birding pole to include a variety of birding accessories such as bird feeders, bird houses, artificial and natural perches and bird baths. The modules include (i) pole modules to secure the modular pole system to the ground and/or increase the overall length of the modular pole system, (ii) attachment modules to removably attach accessories to the pole modules, and (iii) cap modules that can be removably attached to pole modules to inhibit rain water from entering the inside of the pole modules. In particular, an auger pole module of the modular pole system is used in conjunction with a stabilizing pole attachment module to resist the adverse effects of wind. The auger module has an auger member fixedly and spirally secured thereto that facilitates the insertion of the auger module into the ground. The stabilizing module has a plurality of arms which distribute the force from the wind over a wider area.

33 Claims, 19 Drawing Sheets

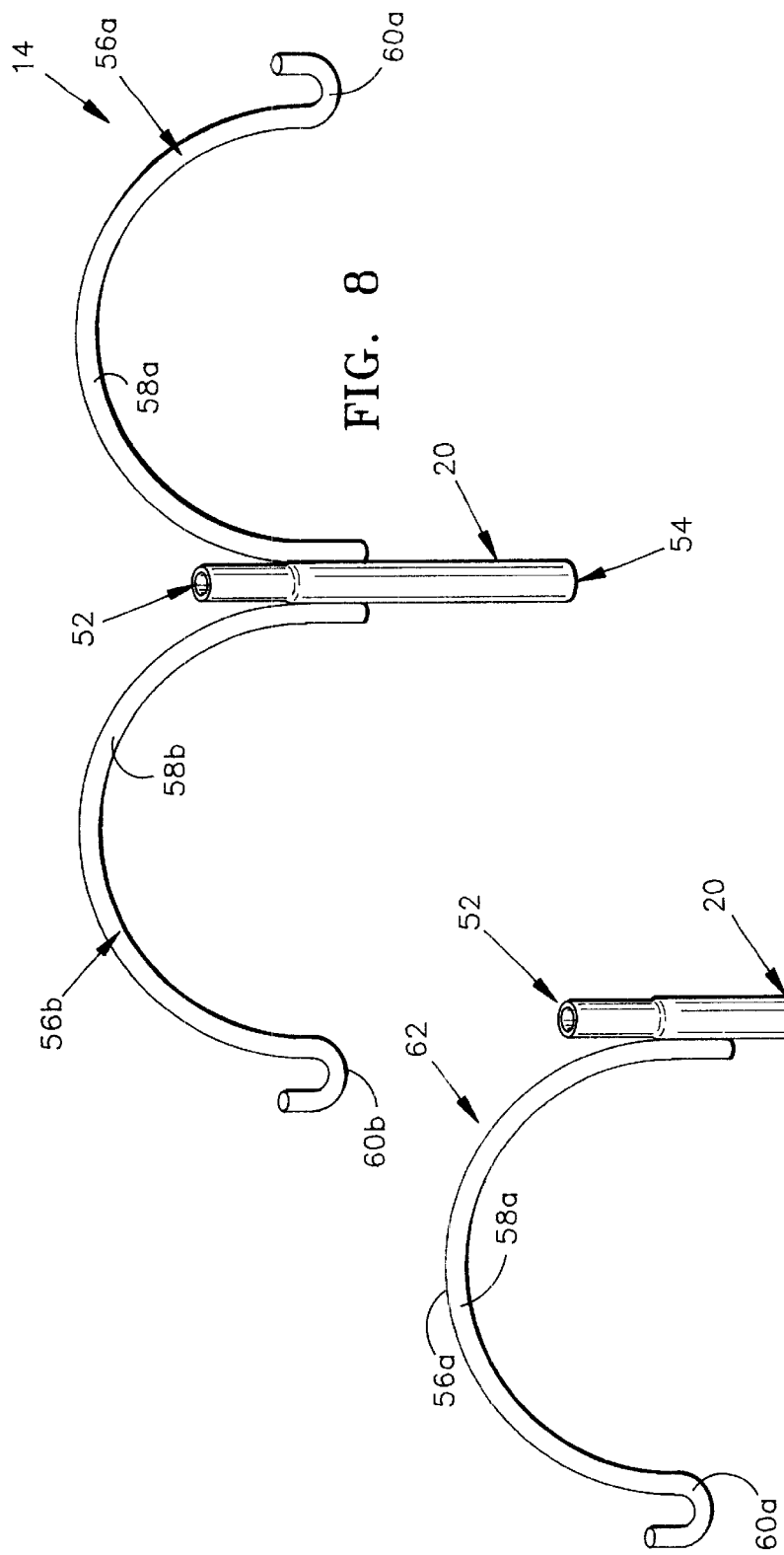

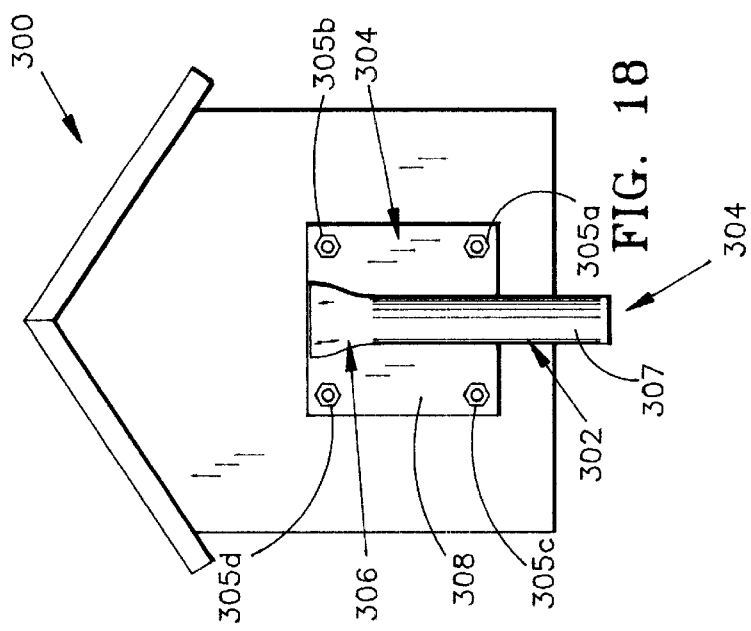
FIG. 18
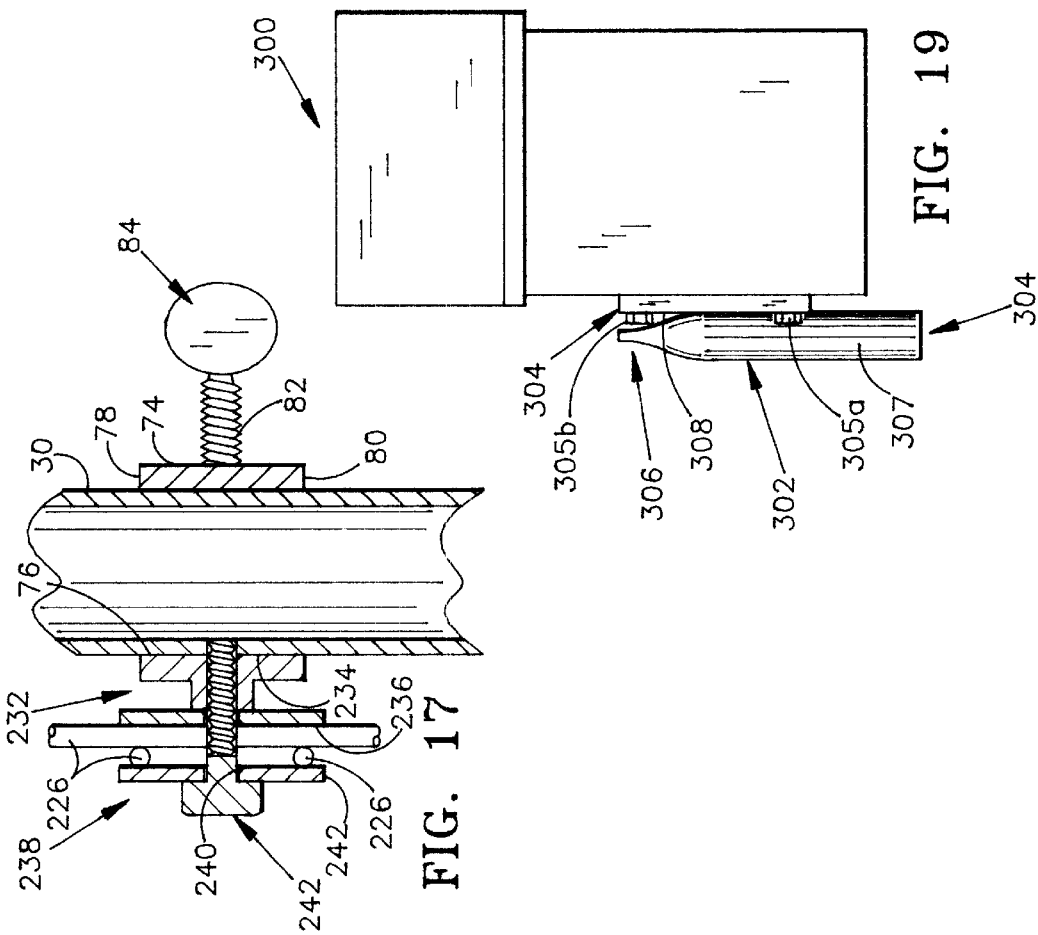
FIG. 19
FIG. 17

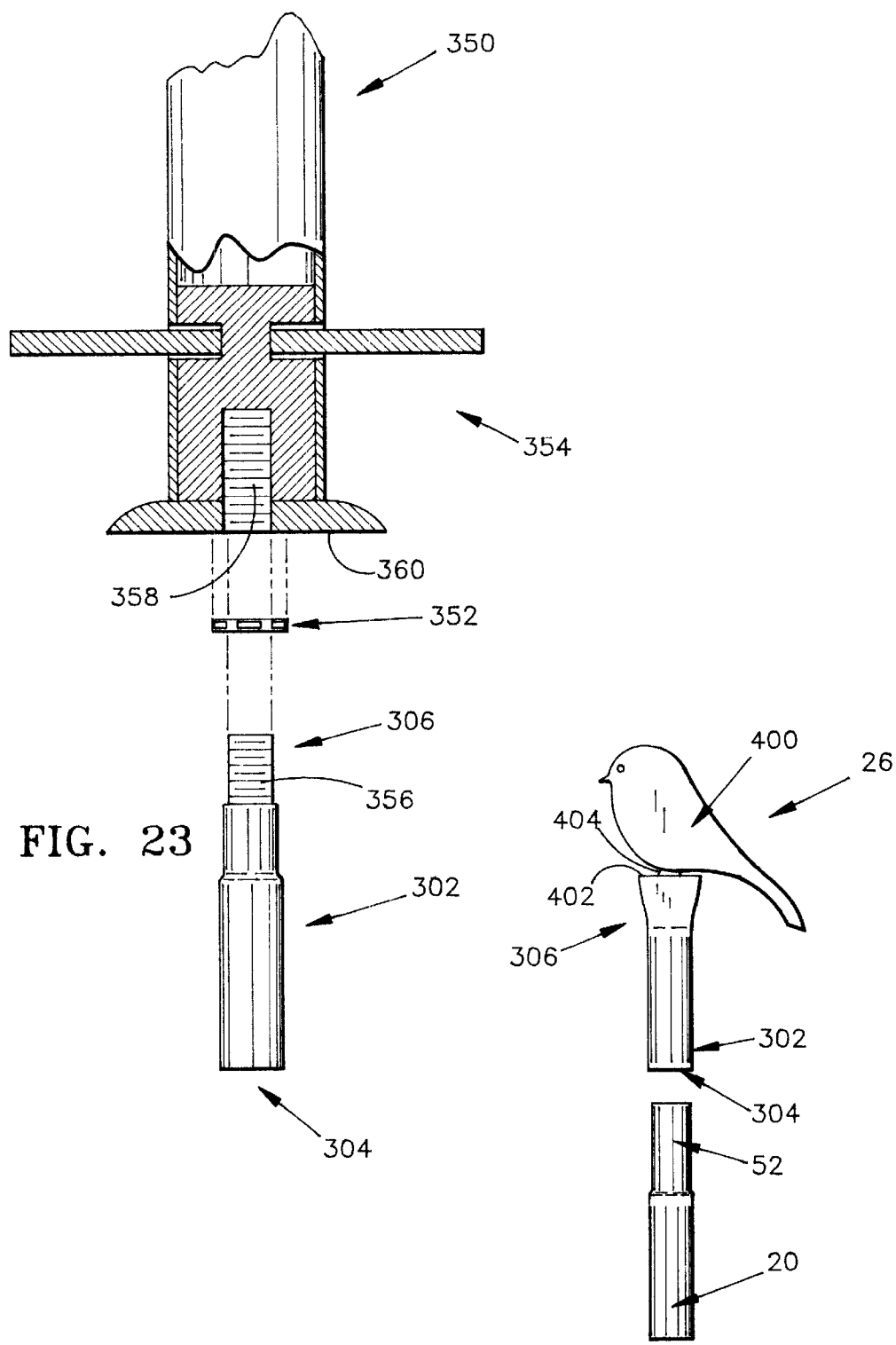

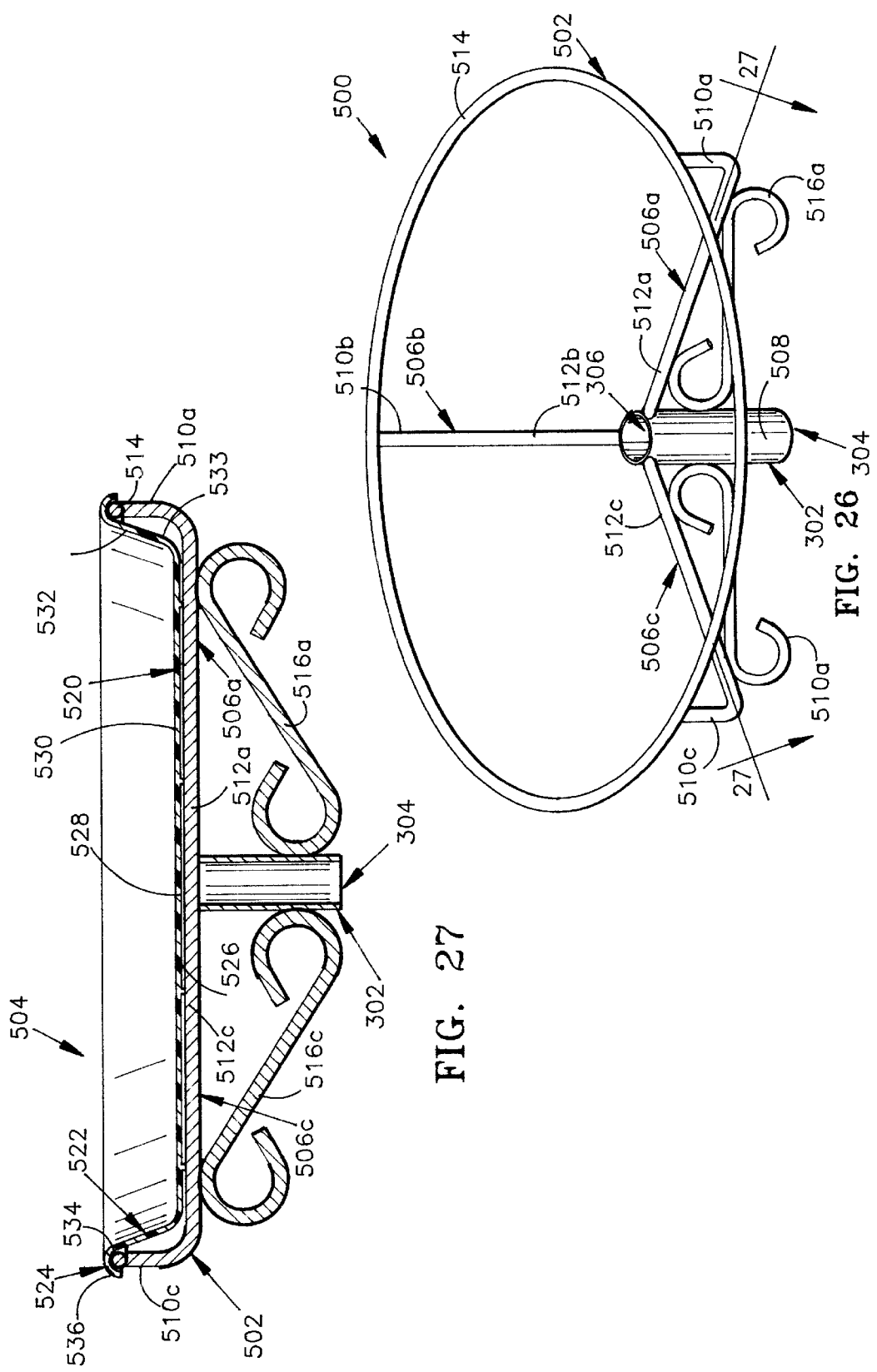

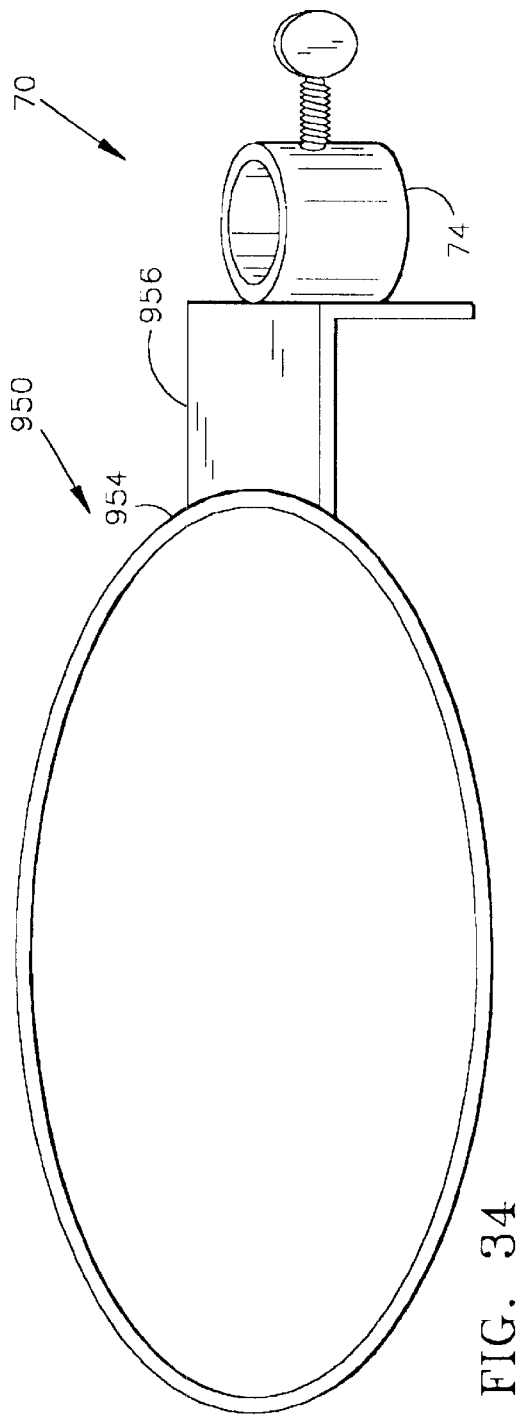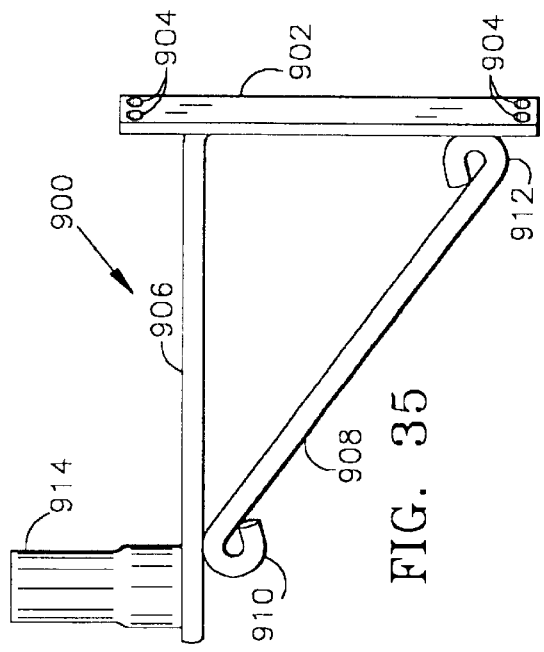

MODULAR BIRDING ACCESSORY POLE AND ASSOCIATED BIRDING ACCESSORIES

REFERENCE TO OTHER APPLICATIONS

This application claims the benefit of U.S. Provisional Application No. 60/140,891, filed Jun. 24, 1999.

TECHNICAL FIELD

The present invention relates to a pole system and more particularly to a modular pole system that is especially well adapted for mounting modular components birding accessories such as feeders, houses, and perches thereon.

BACKGROUND OF THE INVENTION

For quite sometime, birding has been a very popular hobby. Many people find that watching birds is a pleasant, relaxing, and educational way to spend time and observe nature. Although some bird watching is performed in a nature preserve-like settings, such as at parks and forests, much bird watching also occurs in and around the homes and yards of the bird watchers. To help better attract birds to watch, many people erect various bird attracting devices such as bird houses, feeders and baths. Examples of bird houses, feeders and baths can be found in any number of department stores, hardware stores, or nature stores such as the franchise stores of WILD BIRDS UNLIMITED, INC., one of the Assignees of the instant application. Along with the bird houses, feeders and baths, mounting hardware must be employed in order to place the bird house or bird feeder at a desired location. This mounting hardware can be as simple as a rope or wire that ties the bird attracting device to the branch of a tree; or a plurality of nails that nail a bird house, feeder or bath to either a tree or a wall.

In addition to this above-described simple hardware, more elaborate hardware exists such as mounting brackets and poles onto which a bird attracting device may be hung. Examples of existing, prior art mounting hardware can be found in the following catalogs:

1. ERVA TOOL AND DIE COMPANY, 1998 catalog, produced by the Erva Tool and Die Company of 3100 West Grand Avenue, Chicago, Ill. 60622–4234;
2. THE GREEN ESTEEM® GARDENING ACCESSORIES, 1999 catalog, produced by Hiatt Manufacturing, Inc. of 4410 Theurer Boulevard, Winona, Minn. 55987 (Website www.greenesteem.com);
3. MARKERS, INC. HOLES 'N' POLES Family of Yard Products 1998 catalog, produced by Markers, Inc. of 33597 Penn Oak Parkway, Avon Lake, Ohio 44012;
4. THE 1998 BLACKSMITH SERIES CORELINE HANGERS catalog, produced by the Whiskeyville Planters Company of Indiana; and
5. THE HOLSCHER PRODUCTS, INC. 1998 catalog, that is produced by Holscher Products, Inc. of 407 West Main Street, Fowler, Ind. 47944, who is also one of the Assignees of the present invention.

Although a large number of various bird feeder and bird house hangers exist that perform their desired function(s) in a workmanlike manner, room for improvement still exits. In particular, room for improvement exists in producing a hanging system that permits the user to better customize the system to fit the desired application.

One object of the present invention is to provide a device that is modularly constructed to provide the user with extreme flexibility in choosing the configuration of his mounting hardware, so that he or she may better customize the mounting hardware to fit their particular needs and desires, and compliment their preferred bird attracting device.

SUMMARY OF INVENTION

The present invention relates to a modular pole system that is particularly well adapted for those who enjoy birding by providing a multitude of different modules to allow the birder to custom design her birding pole to include a variety of birding accessories such as bird feeders, bird houses, artificial and natural perches and bird bathes.

The different modules can be classified into three categories for ease of understanding. The first category is pole modules that are used to secure the modular pole system to the ground and/or increase the overall length of the modular pole system. Pole modules can also have accessories, such as shepherd's hooks, permanently attached to them.

The second category is pole attachment modules. Pole attachment modules are accessories that can be removably attached to pole modules. Examples include bird feeders, suet cages, squirrel baffles, banners or signs and representations of vegetation.

The third category is cap modules. Cap modules are accessories that can be removably attached to pole modules at the top of the pole modules. The main purpose of cap modules is to inhibit rain water from entering the inside of the pole modules. Additionally, the top of the birding pole is a place of distinction and can have a prominent feature placed thereon, such as a bird bath, bird house, bird feeder or statue, or a decorative item.

One feature of the present invention is that it provides a wind-resistant foot system. An auger pole module is used in conjunction with a stabilizing pole attachment module to accomplish this wind resistance. The auger module has a auger member fixedly and spirally secured thereto that facilitates the insertion of the auger module into the ground. Once in the ground, the auger resists the axially directed extraction of the auger module from the ground. The stabilizing module has a plurality of arms for distributing the force from the wind over a wider area to resist radial (tilting) movement of the pole, which helps to keep the modular birding pole from leaning, or from being blown over by the wind.

It is another feature of the present invention to provide an accessory mounting hook, such as a shepherd's hook, that is welded directly to the main pole of the modular birding pole. This is accomplished by the shepherd's hook pole module that acts like a pole extension module but has at least one shepherd's hook welded thereto.

A further feature of the present invention is to provide a dish module that allows for the easy extraction and installation of a bird food dish. The dish module of the present invention includes a dish holder member having support rods that hold a dish securely in place. Additionally, the support rods permit the easy extraction and installation of the dish by simply tilting the dish relative to the dish holder.

It is yet another feature of the present invention to provide an cap module that both inhibits rain water from entering the pole modules and provides a distinctive appearance to the modular pole system. Several cap modules are disclosed that accomplish both tasks.

An additional feature of the present invention is that is provides a bird bath holder for holding a bird bath and allowing the easy extraction of the bird bath for refilling or cleaning. This feature is achieved by a bird bath cap module that contains a bird bath holder. The bird bath holder has a support ring for supporting the periphery of the bird bath and horizontal support bars for supporting the underside central surface of the bird bath. The bird bath simply rests on top of the bird bath holder. The holder can also be designed to provide a positive snap-in engagement of the bird bath over the support ring for resisting dislodgement of the bird bath from the bird bath holder.

It is a further feature of the present invention to provide a complete modular system that allows the customer to custom design their birding pole. The modules disclosed allow the user to vary the height of their birding pole. The customer can also pick and choose the accessories they would like to mount to the pole, and can even choose some customized accessories such as a banner module or a sign module for varying the appearance of the pole.

Additional objects, features and advantages of the invention will become apparent to those skilled in the art upon consideration of the following detailed descriptions of the preferred embodiments exemplifying the best mode of carrying out the invention as presently perceived.

BRIEF DESCRIPTION OF DRAWINGS

FIG. 7 is a perspective view of a single shepherd's hook module.

FIG. 8 is a perspective view of a dual shepherd's hook module;

FIG. 17 is a sectional view of the suet cage module of FIG. 16 taken along lines 17—17 in FIG. 16;

FIG. 18 is a rear elevation view of a birdhouse module;

FIG. 19 is a side elevation view of a birdhouse module;

FIG. 23 is a front elevation view of a cylindrical birding pole cap module with some elements shown in section;

FIG. 24 is a front elevation view of a statue cap module;

FIG. 26 is a perspective view of a three leg bird bath cap module with the bird bath not shown;

FIG. 27 is a sectional view of the three leg bird bath holder module including a bird bath taken along lines 27—27 in FIG. 26.

FIG. 34 is a perspective view of a bird bath holder module; and

FIG. 35 is a side view of a decorative wall mount.

DETAILED DESCRIPTION

The modular birding pole 10 of the present invention allows the user to custom design her birding pole system. The user can pick from a multitude of different modules to provide her pole with a unique and distinctive look. The following disclosure details several different exemplary modules for teaching the present invention to the reader. However, the present invention should not be limited to only the embodiments disclosed herein.

Figure 1:
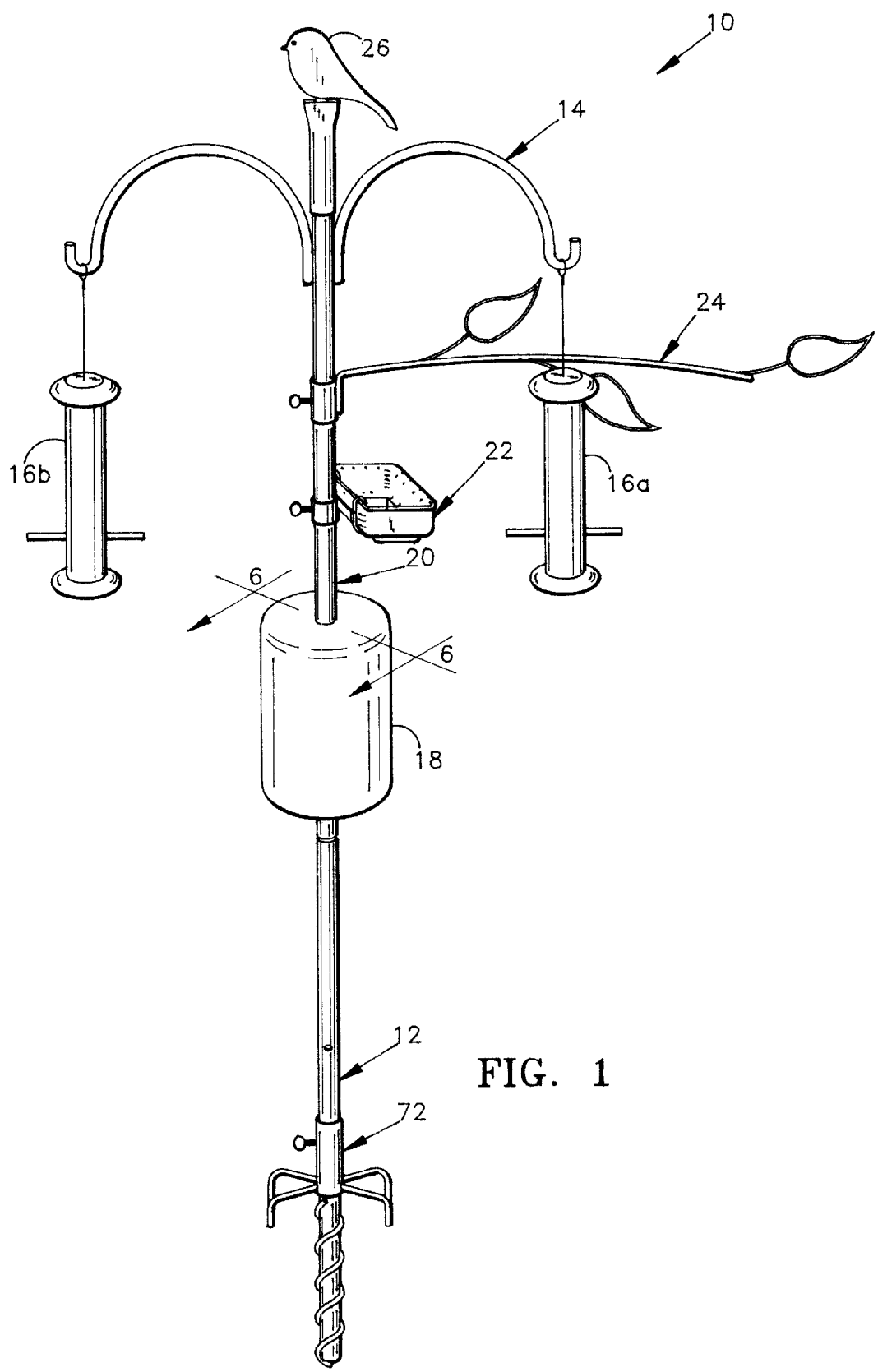
FIG. 1 is a perspective assembly view of one example of the modular birding pole system.
Figure 2:
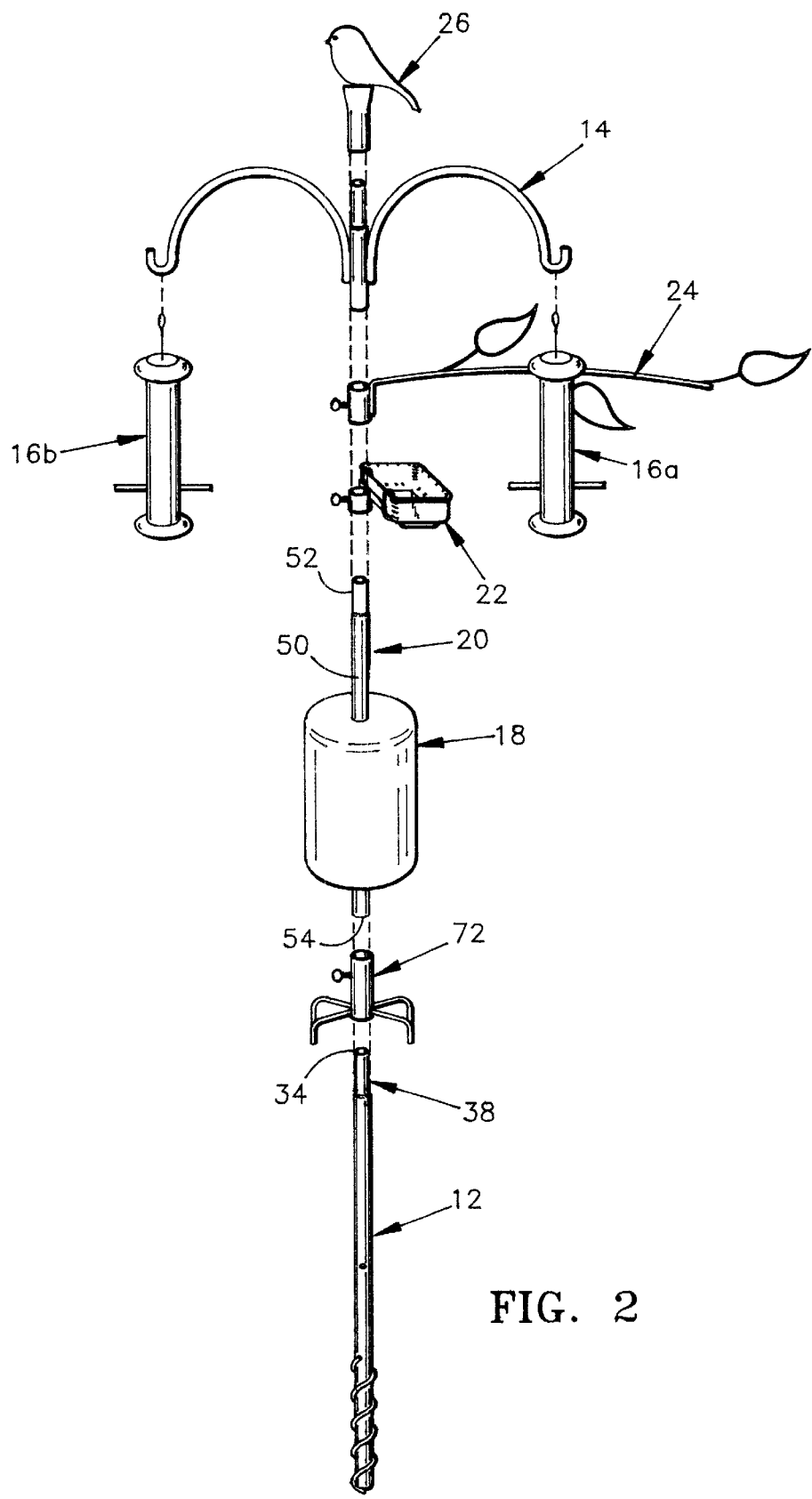
FIG. 2 is an exploded, perspective view of the modular birding pole system shown in FIG. 1.

The modular birding pole 10 of the present invention is shown in FIG. 1 as including an auger pole module 12, a dual shepherd's hook module 14 having two poles 16a, 16b attached thereto, a squirrel baffle module 18, a pole extension module 20, a dish module 22, a branch with leaves module 24; a statue cap module 26 and a stabilizing module 72. FIG. 2 is an exploded view of the modules of FIG. 1. The various modules can be classified into three different categories: (1) pole modules; (2) pole attachment modules; and (3) cap modules. The classifications are provided only to aid the reader in understanding the function of each module, and not to limit the structure or function of any module.

All of the disclosed components are made primarily of metal. However, each component could also be made of a molded or extruded plastic. If the components are plastic instead of metal, typical plastic bonding techniques should be used in place of welding. Examples are an adhesive, sonic welding, or snap features.

A. Pole Modules

Figure 3:
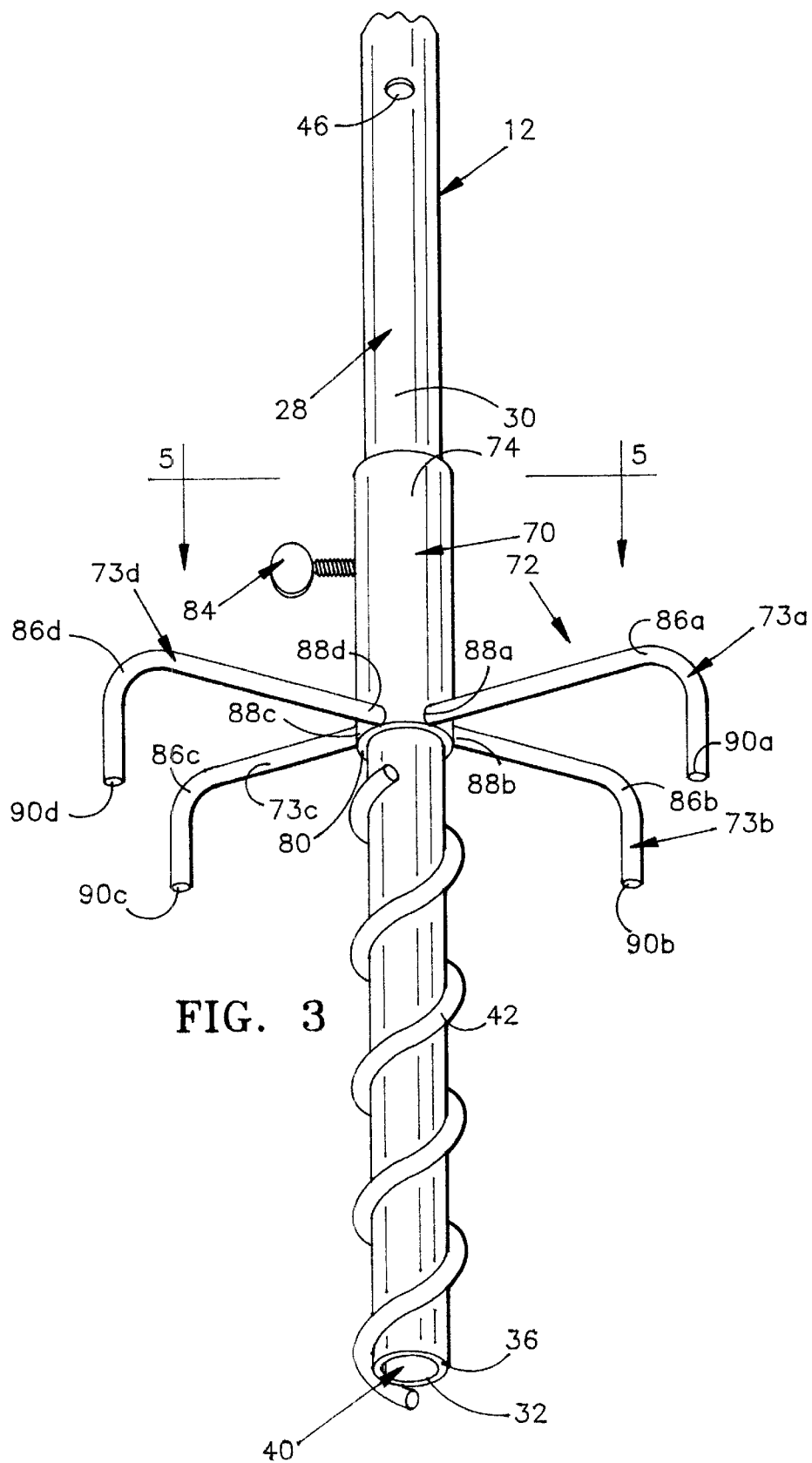
FIG. 3 is an enlarged view of the auger and support bracket of the modular birding pole system shown in FIG. 1.

Pole modules are used to vary the length of the birding pole and/or to secure the pole to the ground 44. A first pole module is auger pole module 12 shown in FIG. 1 and in detail in FIGS. 3 and 4. Referring to FIG. 3, auger pole module 12 includes a hollow, cylindrical member 28 having an outwardly-facing, cylindrical surface 30, an inwardly-facing, cylindrical surface 32 that defines a generally hollow interior; a top, axial surface 34 (shown in FIG. 2) and a bottom, axial surface 36. The radial extent of cylindrical member 28 narrows or necks down toward top, axial surface 34 to provide a male neck portion 38 that can be interiorly slidably received in a snug relation by the female end 40 of cylindrical member 28 at bottom, axial surface 36.

The diameter of the outwardly-facing, cylindrical surface 30 in its portion adjacent to the top, axial surface 34 is slightly less than the diameter of inwardly-facing, cylindrical surface 32 in its portion adjacent to the bottom axial surface 36. The diameter of the outwardly-facing, cylindrical surface 30 is constant from the top axial surface 34 down cylindrical member 28 for approximately 1.5 to 2.5 inches, which portion is the male portion 38 of cylindrical member 28. The female portion 40 of cylindrical member 28 is adjacent to the bottom, axial surface 36. As will be explained in more detail below, the arrangement of having both a male and female portion on cylindrical member 28 allows for pole modules to be coupled together.

Figure 4:
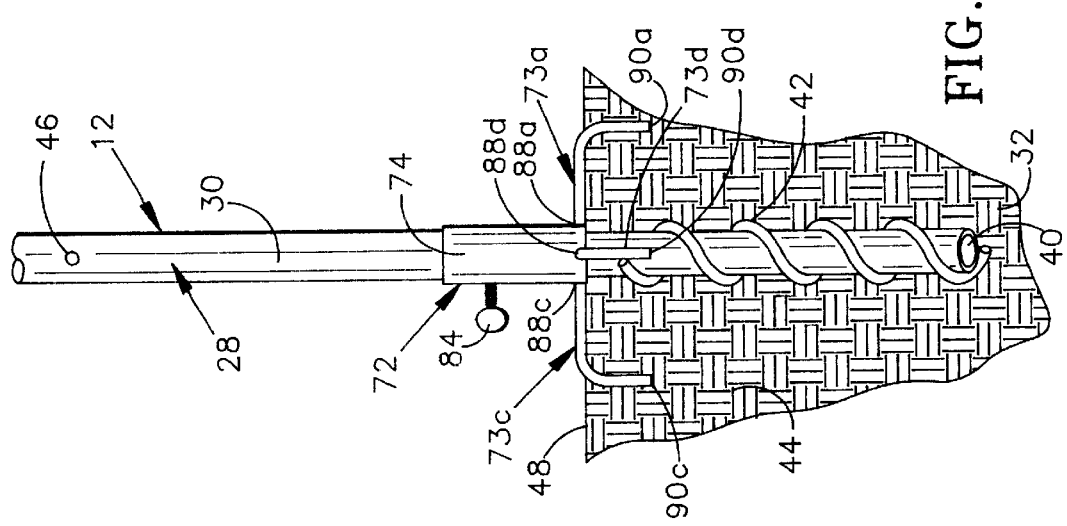
FIG. 4 is a side elevation view of the operation of the auger and support bracket of the modular birding pole system with the ground shown in cross section.

Auger pole module 12 further includes a circular rod 42 wrapped around and welded to outwardly-facing, cylindrical surface 30 near bottom, axial surface 36. Circular rod 42 is wrapped in a right-hand thread fashion and extends slightly below bottom, axial surface 36. Circular rod 42 functions as an auger to facilitate the securing of auger pole module 12 to the ground 44 as shown in FIG. 4.

Cylindrical member 28 of auger pole module 12 includes an tightening aperture 46 formed in outwardly-facing, cylindrical surface 30 and extending completely through cylindrical member 28. Tightening aperture 46 is preferably disposed approximately one foot below the top axial surface 34 of the cylindrical member 28 of auger pole module 12. Tightening aperture 46 allows for a lever member such as a screwdriver (not shown) to be coupled to auger module 12.

Auger module 12 is inserted into the ground 44 in the following fashion. A screwdriver (not shown) is inserted into tightening aperture 46. Next, the bottom axial surface 36 is positioned next to the upper surface 48 of the ground 44 and an axially downward pressure is applied by the user. The user then uses the screw driver as a handle, turning the screwdriver about an axis perpendicular to its longitudinal axis, to rotate cylindrical member 28 about the cylindrical member's 28 longitudinal axis and thereby engaging circular rod 42 with ground 44. As cylindrical member 28 rotates, circular rod 42 facilitates the movement of cylindrical member 28 into ground 44 in an auger-like manner. Once, auger module 12 is inserted at the appropriate depth into the ground 44, the screwdriver is removed from tightening aperture 46.

Pole extension module 20 is used to increase the axial extent of modular birding pole 10. As best shown in FIG. 2, pole extension module 20 contains a hollow, cylindrical member 50 having the same diameter as cylindrical member 28 of auger module 12. Cylindrical member 50 includes a relatively reduced diameter male portion 52 and a relatively enlarged (when compared to the male portion 52) female portion 54. The definition of both male portion 52 and female portion 54 are identical to the definition provided for male portion 38 and female portion 40 of auger module 12.

Female portion 54 is employed to couple pole extension module 20 to either: (1) male portion 38 of auger module 12; (2) male portion 52 of another piece of pole extension module 20; or (3) the male portion of another type of pole module. Therefore, male portion 52 can be slidably received into, and accepted by female portion 54 of another identical pole extension module 20; the female portion of a different type of pole module; or the female portion 304 (see FIG. 24) of a cap module such as statue cap module 26 in FIG. 1. One feature of the present invention is that the relatively upwardly positioned, downwardly opening female portion accepts the upwardly opening male portion of the module that is positioned below it. Through this arrangement, water seepage into the interior of the cylindrical pole modules is minimized.

Once two pole modules, such as pole extension module 20 and auger module 12, are coupled together they appear, to the casual observer, to be one continuous module. Therefore, the length of modular pole member 10 can be adjusted without detracting from the aesthetic quality of the product.

A wall mount module 900 which is an alternative to using the auger module 12 for anchoring the modular birding pole 10 is shown in FIG. 35. The wall mount module 900 includes a mounting plate 902 having holes 904 which enable fixedly attaching the mounting plate 902 to a structure such as the side of a home or a wooden deck via fasteners such as screws or nails. The wall mount module 900 further includes an arm 906 welded or otherwise fixedly attached to the mounting plate 902 such that the arm 906 extends outwardly from a structure to which the mounting plate 902 is fixedly attached. The wall mount module 900 also includes a brace member 908 welded to the mounting plate 902 and the arm 906 so as to provide the arm 906 with additional structural support.

In the exemplary embodiment, the brace member 908 is implemented with a generally circular rod formed to have hook portions 910 and 912 at the distal ends of the brace member 908 in order to provide a decorative look to the wall mount module 902. It should be appreciated that the wall mount module 900 may be implemented without the decorative elements 910, 912 or may be implement to include further decorative elements such has leaf and scroll elements. Finally, the wall mount module 900 includes a male portion 914 welded to or otherwise fixedly attached to the distal end of the arm 906 so that female portions of other pole modules may be slideably engaged therewith.

In addition, pole modules can have accessories permanently secured thereto, such as the case of dual shepherd's hook module 14. Pole modules can also have accessories secured thereto that are removable. Removable modules are classified as pole attachment modules and will be discussed after pole modules.

One example of a pole module with a permanent accessory is dual shepherd's hook 14 shown in FIG. 1 and in FIG. 8. Referring to FIG. 8, it can be seen that dual shepherd's hook 14 is simply a pole extension module 20 with two shepherd's hooks 56*a*, 56*b* welded or otherwise fixedly attached thereto. Shepherd's hooks 56*a*, 56*b* have a circular rod member formed in a generally arcuate portion 58*a*, 58*b* and a upward oriented hook portion 60*a*, 60*b* at the distal end of hooks 56*a*, 56*b*. Shepherd's hooks 56*a*, 56*b* are oriented 180° from each other. Hooks 60*a*, 60*b* are usually used to hold other accessories such as the birding poles 16*a*, 16*b* shown in FIG. 1 or a hanging plant.

The number of shepherd's hooks 56 can be varied. FIG. 7 shows a single shepherd hook module 62 having one shepherd's hook 56*a*. The number of shepherd's hooks 56 and the angular and vertical relationships of shepherd's hooks 56 can be adjusted from that shown in FIGS. 7–8.

Figure 31:
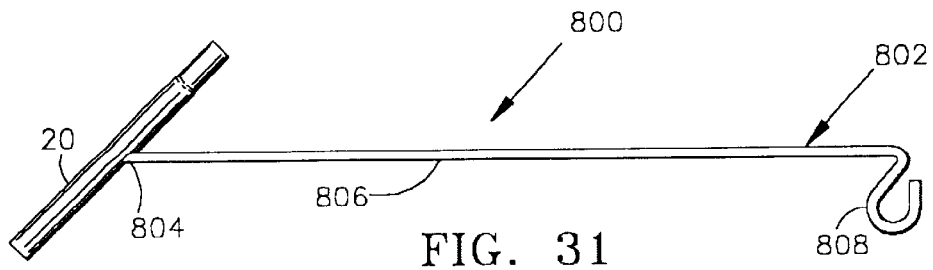
FIG. 31 is a side view of an extended arm module.

Another example of a pole module is an extended arm module 800 shown in FIG. 31. Referring to FIG. 31, it can be seen that the extended arm module 800 simply comprises a pole extension module 20 with an arm 802 welded or otherwise fixedly attached thereto. In particular, the arm 802 of the exemplary embodiment is fixedly attached to the pole extension module 20 such that the arm 802 extends radial outward and upward from the pole extension module 20. In the exemplary embodiment, the arm 802 is essentially implemented with a circular rod member formed to have a mounting portion 804, a generally strait portion 806, and a upwardly oriented hook portion 808 at the distal end of the arm 802.

Figure 32:
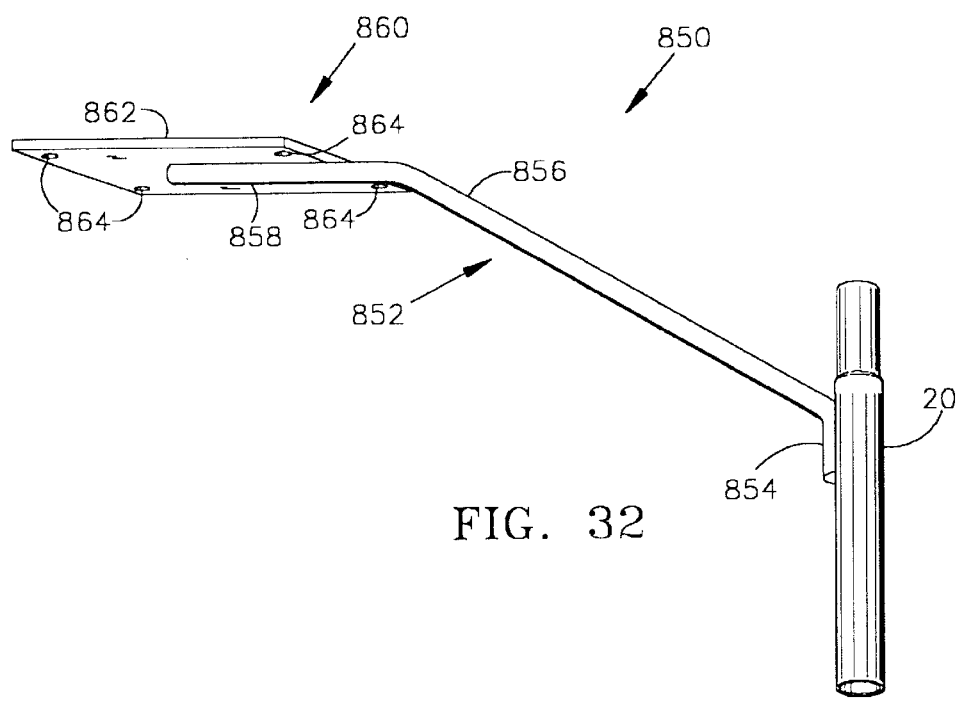
FIG. 32 is a side view of a flanged arm module.

Yet another example of a pole module is a flanged arm module 850 shown in FIG. 32. Referring to FIG. 32, it can be seen that the flanged arm module 850 simply comprises a pole extension module 20 with an arm 852 welded or otherwise fixedly attached thereto and a flange 860 at a distal end of the arm 852. In particular, the arm 852 of the exemplary embodiment is fixedly attached to the pole extension module 20 such that the arm 852 extends radial outward and upward from the pole extension module 20. In the exemplary embodiment, the arm 852 essentially comprises a circular rod member formed to have a mounting portion 854, a generally strait portion 856, and a flange mounting portion 858 at the distal end of the arm 852. Moreover, the flange 860 is welded or otherwise fixedly attached to the flange mounting portion 858. The arm 852 is generally formed such that when the flanged arm module 850 is in use the flange 860 provides a generally horizontal surface 862 and holes 864 which enable birding accessories such as a bird house or bird feeder to be attached thereto.

Figure 33:
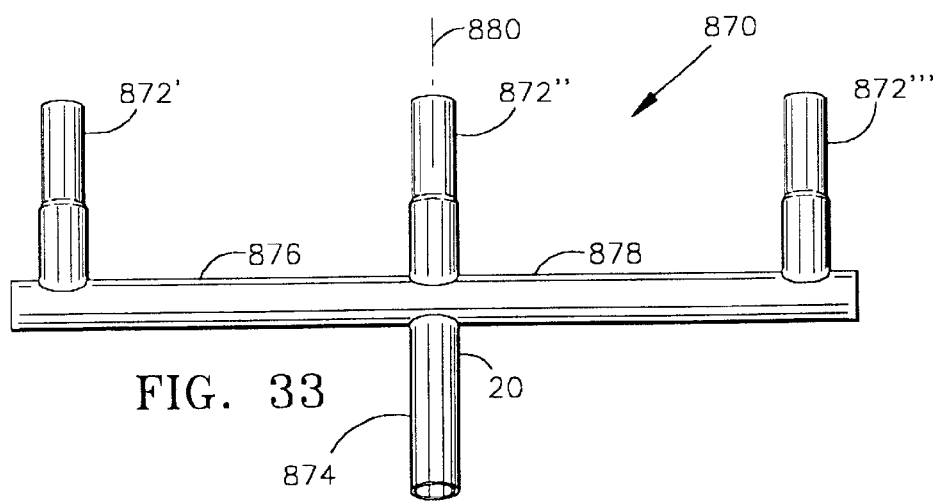
FIG. 33 is a side view of an adapter module.

A further example of a pole module is an adapter module 870 shown in FIG. 33.

Referring to FIG. 33, it can be seen that the adapter module 870 simply comprises a pole extension module 20 that provides two or more a male neck portions 872', 872", 872''' that can be interiorly slidably received in a snug relation by a female end portion of other pole modules. The exemplary adapter module 870 includes three male neck portions 872', 872", 872''' that are fixedly attached to a single female end portion 874. More specifically, the female end portion 874 is welded or otherwise fixedly attached to a first pole portion 876 extending radially outward from the female end portion 874, a second pole portion 878 extending radially outward from the female end portion 874, and the second male neck portion 872" extending from the female end portion 874 in a coaxial manner. Furthermore, the first male neck portion 872' is fixedly attached to a distal end of the first pole portion 876 and the second male neck portion 872" is fixedly attached to a distal end of the second pole portion 878. The adapter module 870 generally enables the splitting of the modular pole into multiple branches in order to extend the number of accessories which may be mounted thereto. Those skilled in the art should also appreciate that the adapter module 870 is preferably radially symmetrical about an axis 880 that is coaxial with the female end portion 874.

It is within the scope of the present invention to have additional types of pole modules. It will be apparent to those skilled in the art to modify the pole attachment modules to be a permanent pole module such as dual shepherd's hook 14. It is also within the scope of the present invention to convert dual shepherd's hook 14 to a pole attachment module.

B. Pole Attachment Modules

Pole attachment modules can serve either a functional or aesthetic purpose or both. The basic component of all pole attachment modules is the pole sleeve 70. The structure and function of pole sleeve 70 will be discussed in conjunction with the stabilizing module 72. It should be understood that the pole sleeve of every module is generally identical to pole sleeve 70 of stabilizing module 72 unless otherwise stated.

Referring to FIG. 3, stabilizing module 72 contains a pole sleeve 70 and a plurality of stabilizing arms 73*a–d*. Stabilizing module 72 is used to stabilize modular birding pole 10 with respect to ground 44. Typically, in the absence of stabilizing module 72, the wind may work auger module 12 loose in the ground. This might result in modular birding pole 10 leaning from vertical or falling over. Stabilizing arms 73*a–d* solve this problem by spreading the force from the wind over a larger area, to import additional radial stability to the pole.

Figure 5:
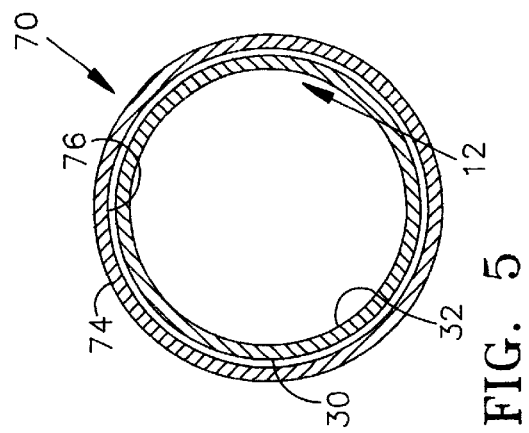
FIG. 5 is a sectional view of the pole and pole sleeve taken along line 5—5 in FIG. 3.

Pole sleeve 70 of stabilizing module 72 is cylindrical in shape and has an outwardly-facing cylindrical surface 74 (FIG. 4), an inwardly-facing cylindrical surface 76 (FIG. 17), a top axial surface 78 (FIG. 17) and a bottom axially facing surface 80 (FIG. 3). The diameter of radially inwardly-facing cylindrical surface 76 is slightly greater than that of outwardly-facing cylindrical surface 30 of auger module 12, as shown in FIG. 5, to allow stabilizing module 72 to slide over auger module 12. Pole sleeve 70 will also slide over pole extension modules 20. Pole sleeve 70 has a radially extending threaded aperture 82 (see FIG. 17) that is formed in radially, outwardly-facing, cylindrical surface 74 which extends through to inwardly-facing, cylindrical surface 76. Threaded aperture 82 accepts a thumb screw 84, although other types of screws could be used in place of thumb screw 84. Examples include flat head screws, set screws, or machine screws. Alternatively, a cam member with a lever or any other commonly available tightening means can be used as the tightening mechanism.

To secure pole sleeve 70 to auger member 12, thumb screw 84 is threaded radially inwardly into threaded aperture 82 until it presses against outwardly-facing cylindrical surface 30 of auger module 12. To loosen or slide pole sleeve 70 relative to auger member 12 or other pole module, thumb screw 84 should be threaded radially outwardly until thumb screw 84 is out of contact with outwardly-facing, cylindrical surface 30.

Stabilizing member 72 has four stabilizing arms 73*a–d* welded to outwardly-facing, cylindrical surface 74. Each stabilizing arm 73 has a L-shaped circular rod 86. A first end 88 of rod 86 is welded to pole sleeve 70. The second end 90 of rod 86 extends downwardly toward ground 44. When stabilizing member 72 is in its correct placement, second end 90 extends below ground surface 48.

The distance from second end 90 to pole sleeve 70 is chosen to provide sufficient resistance to wind forces. When the wind blows, stabilizing arms 73 and auger module 12 absorb the force of the wind. Stabilizing arms 73 reduce the force on auger module 12, thereby reducing the chances that auger module 12 will work loose relative to ground 44. If auger module 12 does work loose relative to ground 44, stabilizing arms 73 will help to keep modular birding pole 10 from leaning.

Figure 6:
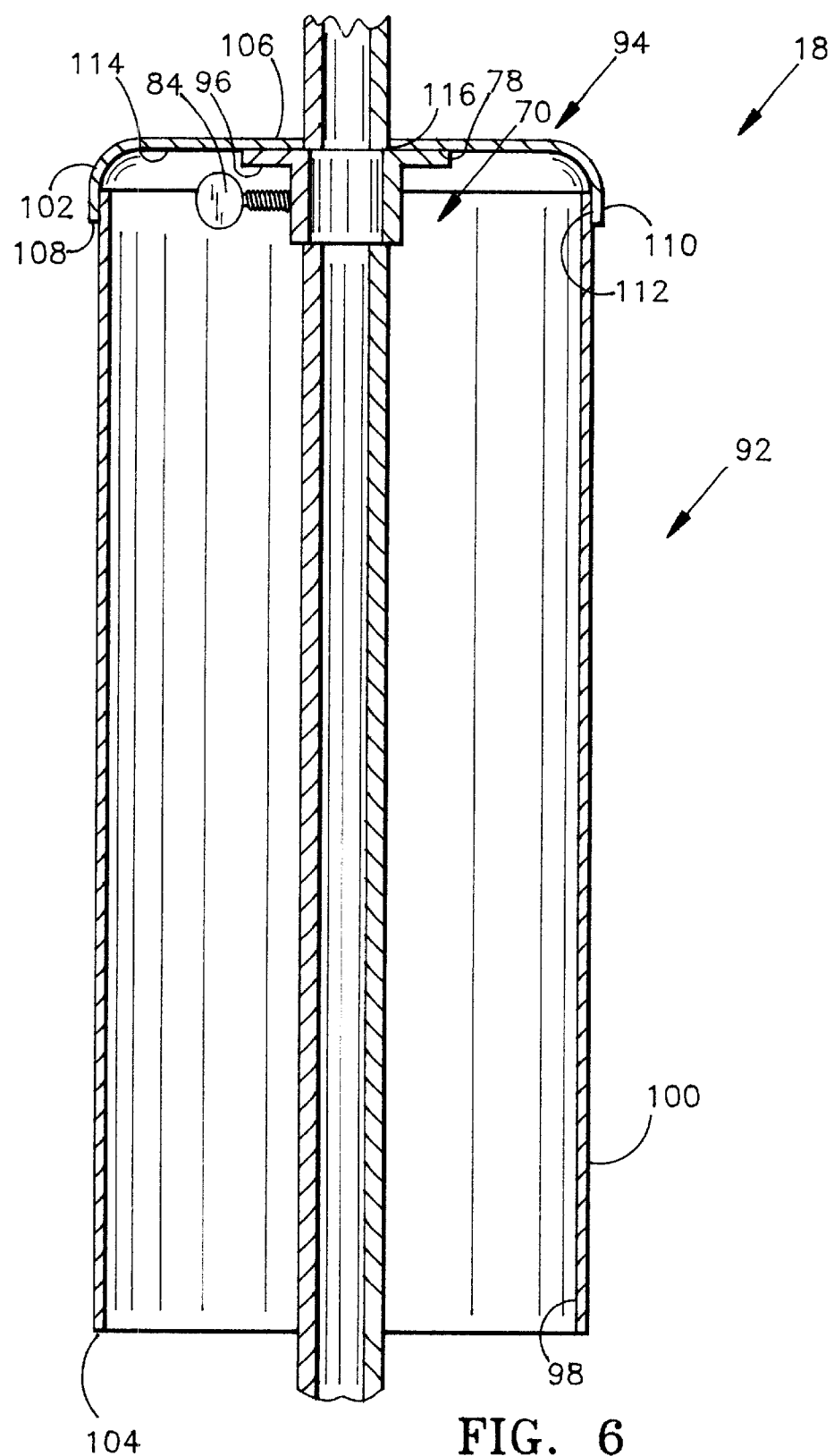
FIG. 6 is a sectional view of the squirrel baffle module of the modular birding pole system along lines 6—6 in FIG. 1.

Another pole attachment module is squirrel baffle 18 shown in FIG. 1 and in section in FIG. 6. Squirrel baffle 18 includes a barrel member 92, a cap 94, a pole sleeve 70 with a flange 96 and a thumb screw 84. Squirrel baffle 18 is usually placed below the location of any birding feeder, such as tube feeders 16*a*, 16*b* in FIG. 1, and is used to hinder the advancement of squirrels or other climbing animals up modular birding pole 10 to the feeders and eating the contents of the feeders 16*a*, 16*b*.

Referring to FIG. 6, barrel member 92 has an inwardly-facing, cylindrical surface 98, an outwardly-facing cylindrical surface 100, a top axial surface 102 and a bottom axial surface 104.

Cap 94 has an outwardly-facing top axial surface 106, a top axial surface 108, an outwardly-facing cylindrical surface 110, an inwardly-facing cylindrical surface 112 and a top, inwardly-facing axial surface 114. Cap 94 is disposed and coupled to the top end of barrel member 92 such that cylindrical, inwardly-facing surface 112 is adjacent to cylindrical outwardly-facing surface 100 of barrel member 92 and top axial inwardly-facing surface 114 is facing top, axial surface 102 of barrel member 92. Cap 94 has an axially centered clearance aperture 116 formed in the top, outwardly-facing axial surface 106 and extending through to top, inwardly-facing axial surface 114. It is within the scope of the present invention, to combine barrel member 92 and cap 94 into one component.

Pole sleeve 70 has a flange 96 disposed at and extending downward from top-axial surface 78 of sleeve 70. Flange 96 provides a seating surface for cap 94. When assembled, top-inwardly-facing, axial surface 114 of cap 94 rests against top, axial surface 78 of pole sleeve 70 as shown in FIG. 6.

Squirrel baffle 18 is assembled to modular birding pole 10 as follows. Pole sleeve 70 is slid over the pole modules of modular birding pole 10 and positioned at the desired height. It should be noted that pole sleeve 70 cannot slide past the shepherd's hooks 56 on a shepherd hook module such as dual shepherd hooks 14. Thumb screw 84 is tightened to secure pole sleeve 70 at the desired height. Next the assembled cap 94 and barrel 92 are slid over the pole modules of modular birding pole 10 such that the pole modules pass through clearance aperture 116 formed in cap 94. The squirrel baffle is completely assembled when top-inwardly-facing, axial surface 114 of cap 94 rests against top, axial surface 78 of pole sleeve 70 as shown in FIG. 6.

The barrel 92 and cap 94 are free to rock on top of flange 96. Therefore, when a squirrel attempts to grasp cylindrical, outwardly-facing barrel surface 100, the barrel 92 and cap 94 rock to impede the progress of the squirrel.

FIGS. 9–12 show dish module 22 as seen in FIG. 1. Dish module 22 includes a pole sleeve 70, a dish 120 and a dish holder 122. Dish 120 is often used to hold water or food for birds.

Dish 120 is a generally rectangular structure with two tiers. The exterior of the lower tier 124 includes four generally vertical outwardly-facing surfaces 126, 128, 130 and 132 and an outwardly-facing generally horizontally disposed, planar bottom surface 134. The interior of lower tier 124 includes four generally vertically disposed, inwardly-facing surfaces 136, 138, 140 and 142 and an inwardly-facing generally horizontally disposed planar bottom surface 144. The intersections of the respective vertical and horizontal surfaces in lower tier 124 are rounded. The exterior of the upper tier 146 includes four generally vertical outwardly-facing surfaces 148, 150, 152 and 154 and an outwardly-facing generally horizontal bottom surface 156. The interior of upper tier 146 includes four generally vertical inwardly-facing surfaces 158, 160, 162 and 164 and an inwardly-facing generally horizontal bottom surface 166. The intersections of the respective vertical and horizontal surfaces in upper tier 146 are rounded. Upper tier 146 has a rounded lip 168 at its top edge. The interior surfaces of upper tier 146 are contiguous with the interior surfaces of lower tier 124 and thereby form one interior cavity. Likewise, the exterior surfaces of lower tier 124 are contiguous with the exterior surfaces of upper tier 146, thereby forming one external surface set.

Figure 12:
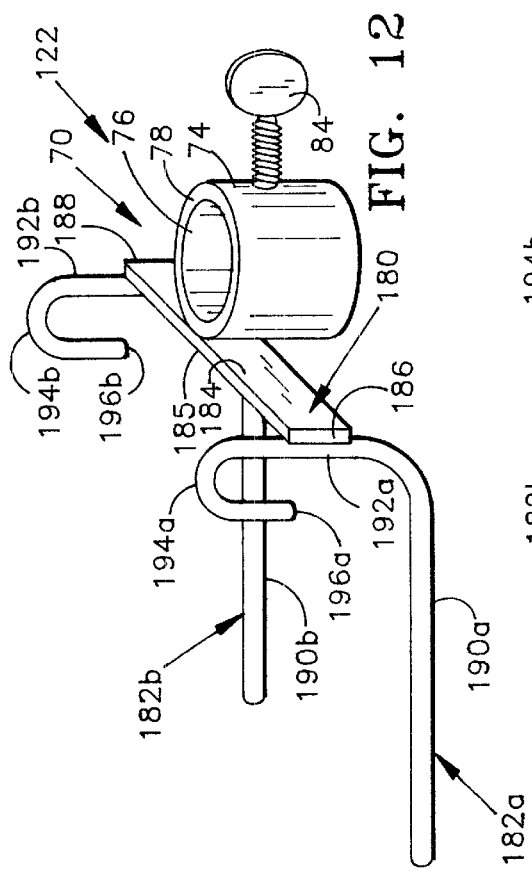
FIG. 12 is a perspective view of the dish module holder shown in FIG. 9.

Referring to FIG. 12, dish holder 122 includes a planar bar 180 and two cylindrical, wire-like support rods 182a, 182b. Surface 184 of bar 180 is welded to outwardly-facing, cylindrical surface 74 of pole sleeve 70. Support rods 182a, 182b are welded to surface 185 of bar 180. The horizontal length of bar 180, defined as the distance between end surface 186 and end surface 188, is sufficient to permit support rods 182a, 182b to pass outboard of exterior, vertical surfaces 128 and 132 of dish lower tier 124 to interiorly receive the vertical surfaces 128 in a snug, gripping relation.

Support rods 182a, 182b are generally identical. Therefore, the structure and function of support rods 182a will be discussed with the understanding that the structure and function of support rod 182b is identical. Support rod 182a has a generally horizontal portion 190a, a generally vertical portion 192a and a hook portion 194a disposed at the top of vertical portion 192a. Vertical portion 192a is the part of support rod 182a that is welded to bar surface 185.

Figure 9:
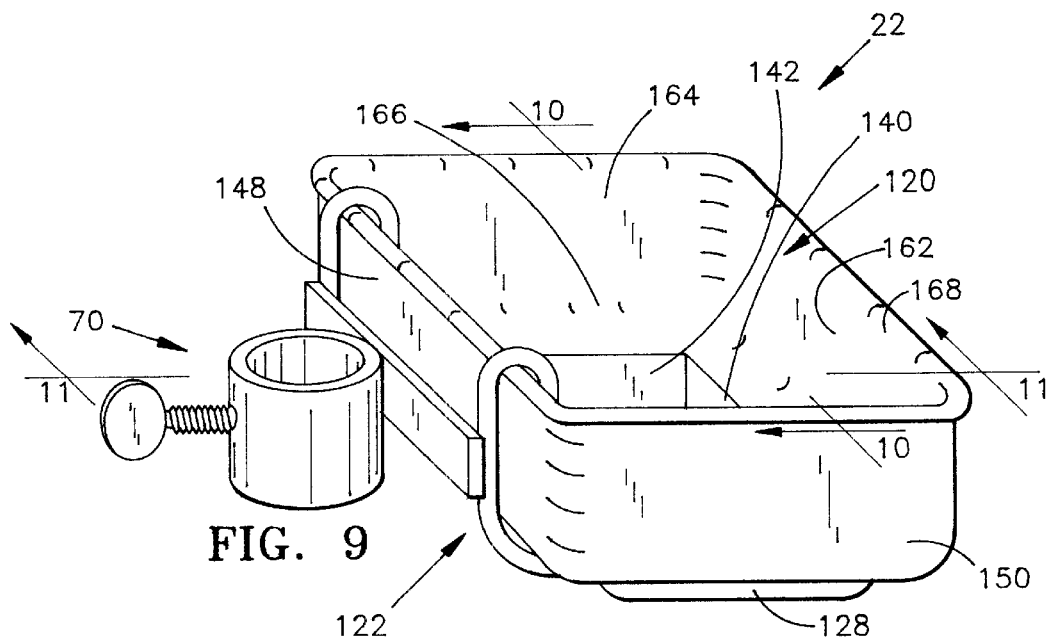
FIG. 9 is a perspective view of the dish module of the modular birding pole system shown in FIG. 1.
Figure 10:
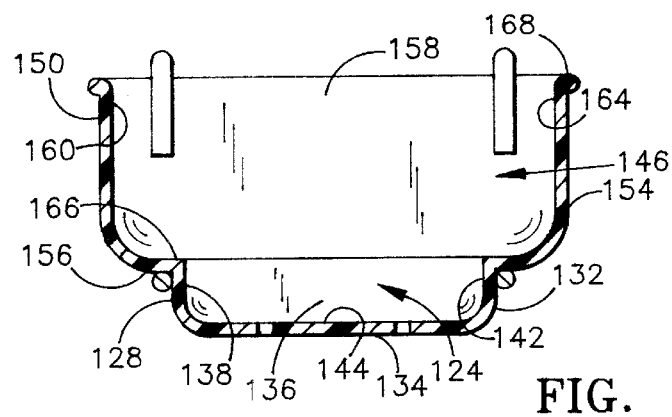
FIG. 10 is a sectional view of the dish module taken along line 10—10 in FIG. 9.
Figure 11:
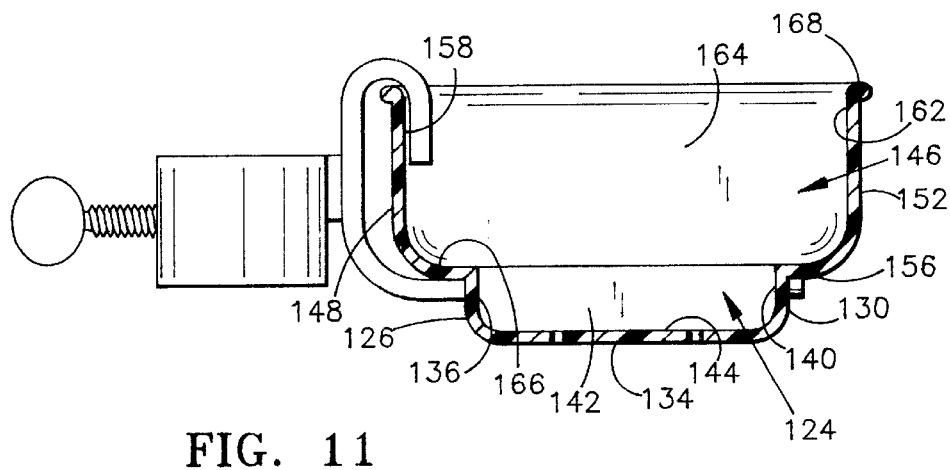
FIG. 11 is a sectional view of the dish module taken along line 11—11 in FIG. 9.

Referring now to FIGS. 9–11, the relationship between dish 120 and dish holder 122 will be explained. Horizontal portion 190a of dish holder 122 supports dish 120 and is located adjacent to outwardly-facing bottom surface 156 of the upper tier 146 of dish 120. Hook portion 194a wraps over rounded lip 168 of dish 120 and is adjacent to vertical, interior surface 158 of the upper tier 146. Hook portion 194a secures dish 120 in the (in-and-out) horizontal plane while horizontal portion 190a secures dish 120 in the vertical and (side-to-side) horizontal planes.

Dish 120 is assembled to dish holder 122 by introducing dish 120 to dish holder 122 at an angle so that rounded lip 168 of dish 120 clears the lower end 196a of hook portion 194a. Lower tier 124 is then positioned generally between horizontal portions 190a, 190b of support rods 182a, 182b. Once rounded lip 168 clears hook lower end 196a, dish 120 is tilted such that outwardly-facing horizontal surface 156 rests upon horizontal portion 190a. The design of dish holder 122 securely holds dish 120 and allows for the easy removal and installation of dish 120.

Figure 29:
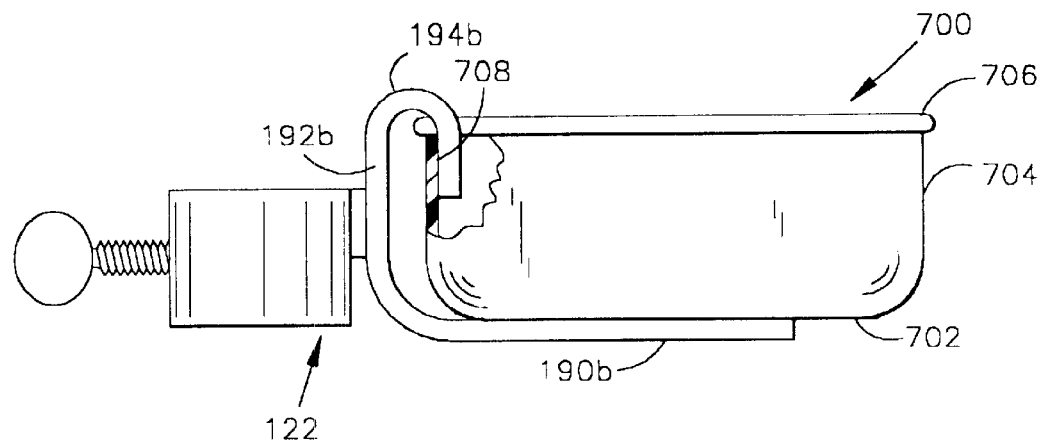
FIG. 29 is a side view of a dish holder an alternative embodiment dish.

The configuration of the dish holder 122 also serves well to hold a single tier dish 700, such as the single tier dish 700 shown in FIG. 29. When used with a single tier dish 700 having a horizontally disposed bottom surface 702, and a generally vertically disposed side surface 704 that terminates at its upper edge in an upwardly facing lip 706, the horizontal portions 190a, 190b of the dish holder 122 are disposed in a spaced parallel relation to engage and support the downwardly facing bottom surface 702 of dish 700. The vertical portions 192a, 192b engage the exteriorly facing vertically disposed side surface 704. In addition, the hook portions 194a, 194b overlay the upwardly facing lip 706 and extend downwardly to engage the interiorly facing vertically disposed side surface 708 of the single tier dish 700. In this manner, the dish holder 122 can securely hold the single tier dish 700, while permitting the user to engage and disengage the single tier dish 700 with the dish holder 122 in a manner generally similar to the two tier dish 120.

Figure 30:
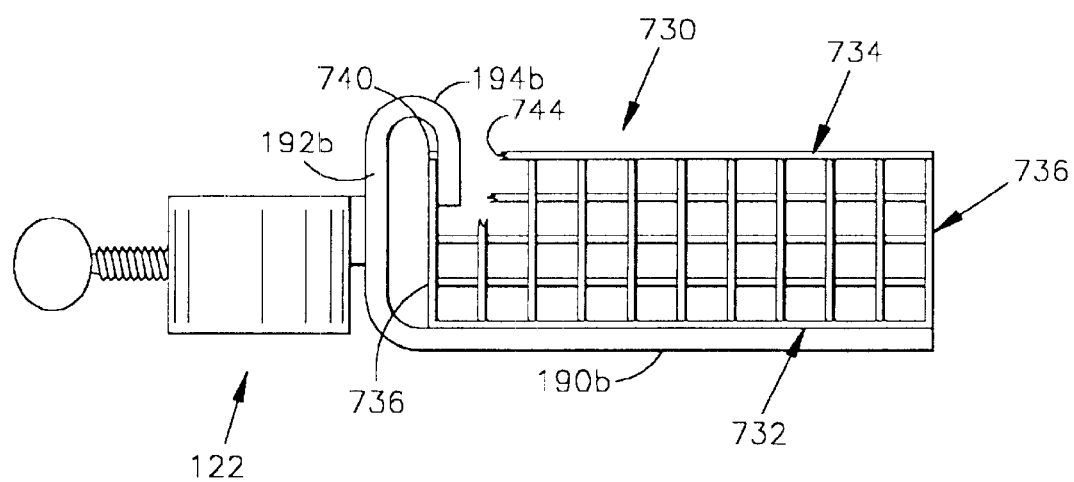
FIG. 30 is a side view of a dish holder and a suet cage.

As best shown in FIG. 30, the dish holder 122 is also capable of holding a suet cage 730 that is comprised of a series of perpendicularly and parallelly disposed thin bars. Similar to the single tier dish 700, the suet cage 730 has a bottom surface 732, a top surface 734 and four generally vertically disposed side surfaces 736. Each of the bottom 732, top 734 and side 736 surfaces comprise an array of cross-hatched bars disposed in a planar array that define an array of apertures between the adjacent bars, through which the birds can feed on the suet cake (not shown) contained within the suet cage 730. In place of a lip, the suet cage 730 contains a series of generally horizontally disposed corner bars (e.g. 740) disposed at the intersection of one of the side surfaces (e.g. 736) and one edge of the top surface 734.

To engage a suet dish 730, the horizontal portions 190a, 190b of the dish holder 122 engage the bars of the bottom surface 732 of the suet cage 730; the vertical portions 192a, 192b engage the exteriorly facing vertically disposed side surface 736; and the hook portions 194a, 194b overlay one of the corner bars 740, pass through an adjacent aperture 744, and extend downwardly to engage the interiorly facing vertically disposed side surface 736 array of bars of the suet cage 730. In this manner, the dish holder 122 can securely hold the suet cage 730, and while permitting the user to engage and disengage the suet cage 730 with the dish holder 122 in a manner generally similar to the two tier dish 120.

Figure 13:
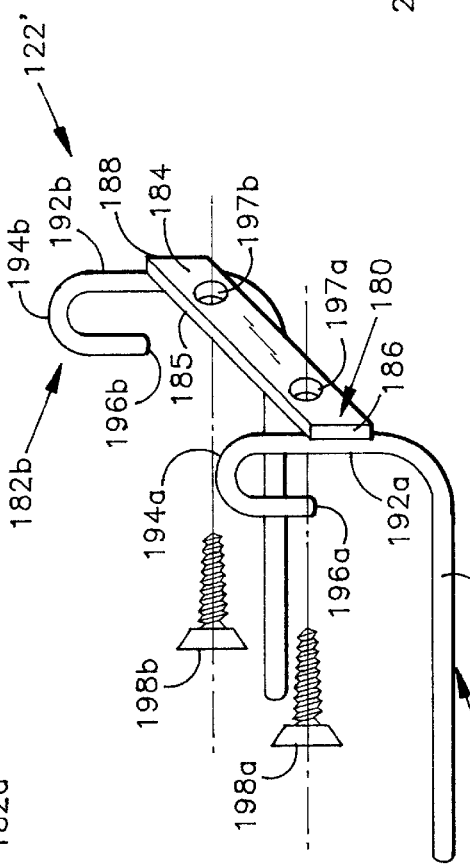
FIG. 13 is a perspective view of a second embodiment of a dish holder.

Dish holder 122 can be modified to attach to a generally planar surface such as a piece of lumber, for example, a wooden pole or a side surface of a wooden bird feeder or birdhouse. FIG. 13 shows a modified dish holder 122'. Pole sleeve 70 has been deleted and bar 180 has two apertures 197a, 197b formed in surface 184 and extending through to surface 185. Apertures 197a, 197b accept two coupling members, such as two wood screws 198a, 198b. Wood screws 198a, 198b secure bar 180 and hence dish holder 122 to the piece of wood (not shown). Aside from the differences pointed out, dish holder 122' is identical in structure and function to dish holder 122.

Figure 14:
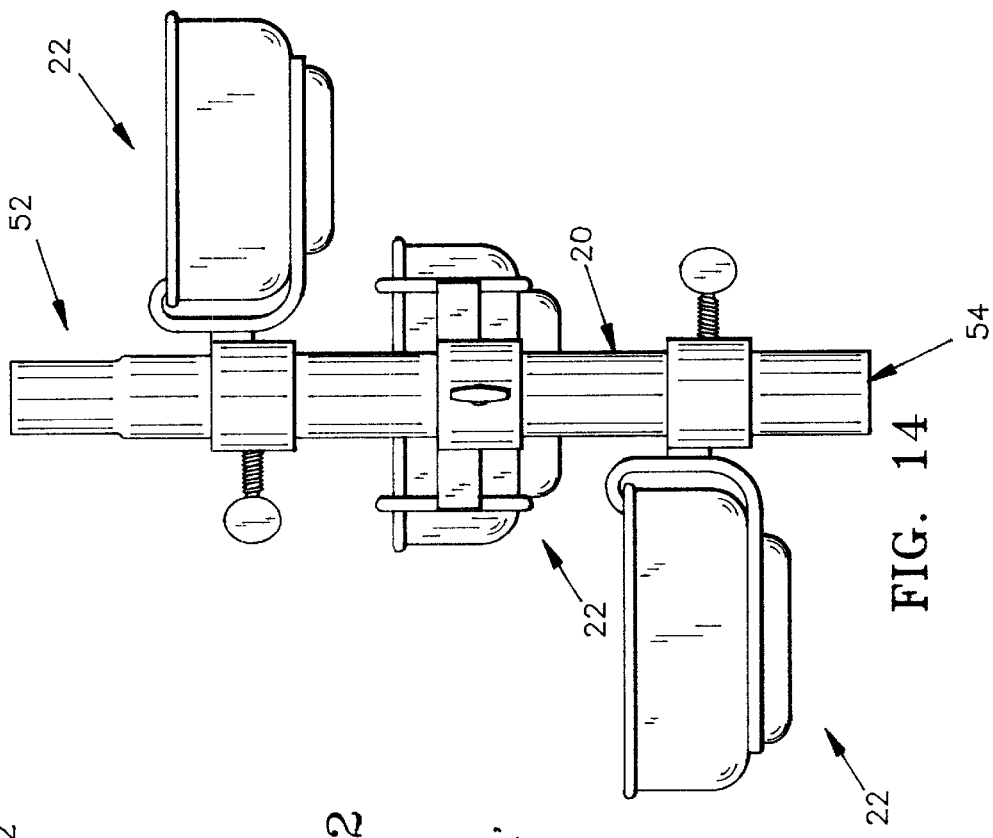
FIG. 14 is a perspective view of a portion of a modular birding pole system incorporating three dish modules.

FIG. 14 shows an example of a pole extension module 20 with three dish modules 22 attached thereto. The three dish modules 22 are angularly and vertically staggered about pole extension module 20.

Figure 15:
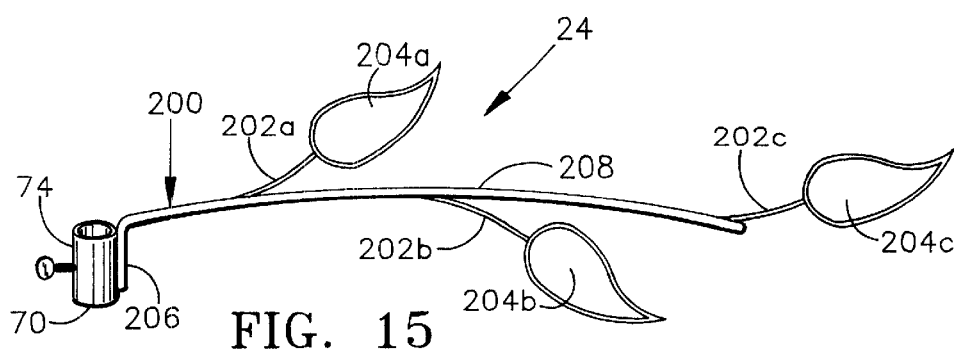
FIG. 15 is a perspective view of a branch with leaves module.

FIG. 15 shows an example of a "branch with leaves" module 24. Branch with leaves module 24 includes a pole sleeve 70, a main branch 200, made out of a circular rod, a plurality of finger branches 202a–c connected to main branch 200 and a plurality of leaves 204a–c connected to finger branches 202a–c. Branch with leaves module 24 assists modular birding pole 10 to blend into its natural surroundings, and more importantly, provides a perch for birds that is adjacent to their feeding source, such as bird feeders 16a and 16b (FIG. 1).

Main branch 200 has a generally vertical portion 206 which is welded to outwardly-facing, cylindrical surface 74 of pole sleeve 70. Main branch 200 also has an outward-extending portion 208 which extends outward from vertical portion 206. Finger branches 202 are welded to main branch 200. Leaves 204 are welded to finger branches 202.

Figure 16:
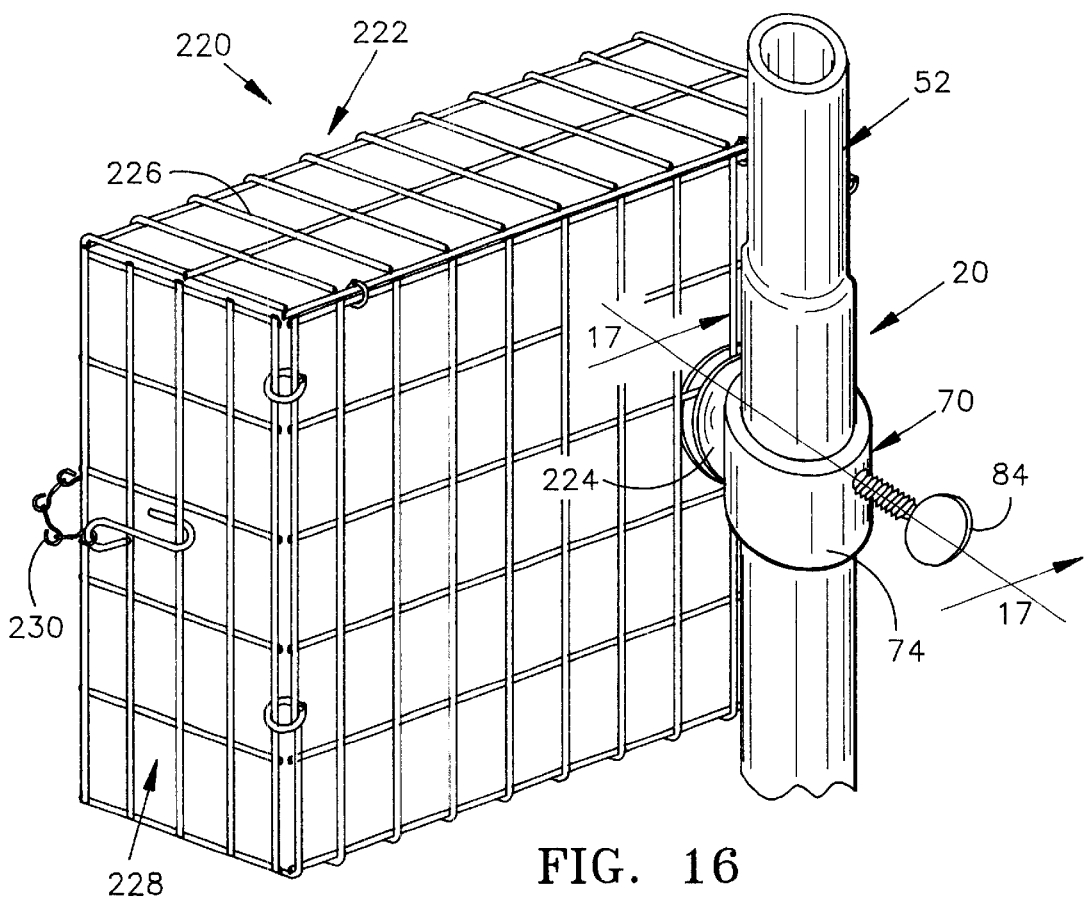
FIG. 16 is a perspective view of a suet cage module attached to a pole module.

FIGS. 16 and 17 show a suet cage module 220. Suet is an animal fat or peanut based bird food sold in cake form for use as an animal feed, and particularly as a bird food. Examples of suet cakes that can function in the present invention can be found at most establishments that sell bird food. Suet cage module 220 includes a cage 222 to hold a suet cake 223 (FIG. 16), a pole sleeve 70 and a coupling member 224.

Cage 222 is generally a rectangular cuboid shape and includes a plurality of bars 226. Bars 226 are generally equally spaced and run in two orthogonal directions on every side of cage 222. Cage 222 also includes a door 228 with a latch 230. Door 228 provides the user with access to the interior of the cage 222. The user opens door 228, inserts the suet cakes into cage 222, closes door 228 and secures latch 230.

Coupling member 224 is used to secure cage 222 to pole sleeve 70. Coupling member 224 has a flange 232 welded to the outwardly-facing pole sleeve surface 74. Flange 232 has an axially extending threaded aperture 234 formed therein that extends from flange mounting surface 236 through to inwardly-facing pole sleeve surface 76. Coupling member 224 has a circular disk member 238 with an aperture 240 formed there through. The radial extent of disk member 238 is defined by radial surface 242 and is larger than the separation between two adjacent bars 226 on cage 222. The same is true for the radial extent of flange 232.

Suet cage module 220 is assembled in the following manner. Pole sleeve 70 along with flange 232 is positioned at the desired height on pole extension module 20. Cage 222 is held up against flange 232 so that at least two adjacent bars 226 contact flange mounting surface 236, and so that flange aperture 234 is centered vertically and horizontally between bars 226. Disk member 238 is then inserted into cage 222 and positioned to align disk aperture 240 with flange aperture 234. A bolt 242 is then passed through disk aperture 240 and threaded into flange aperture 234. Once bolt 242 is tightened, suet cage module 220 is assembled.

Figure 20:
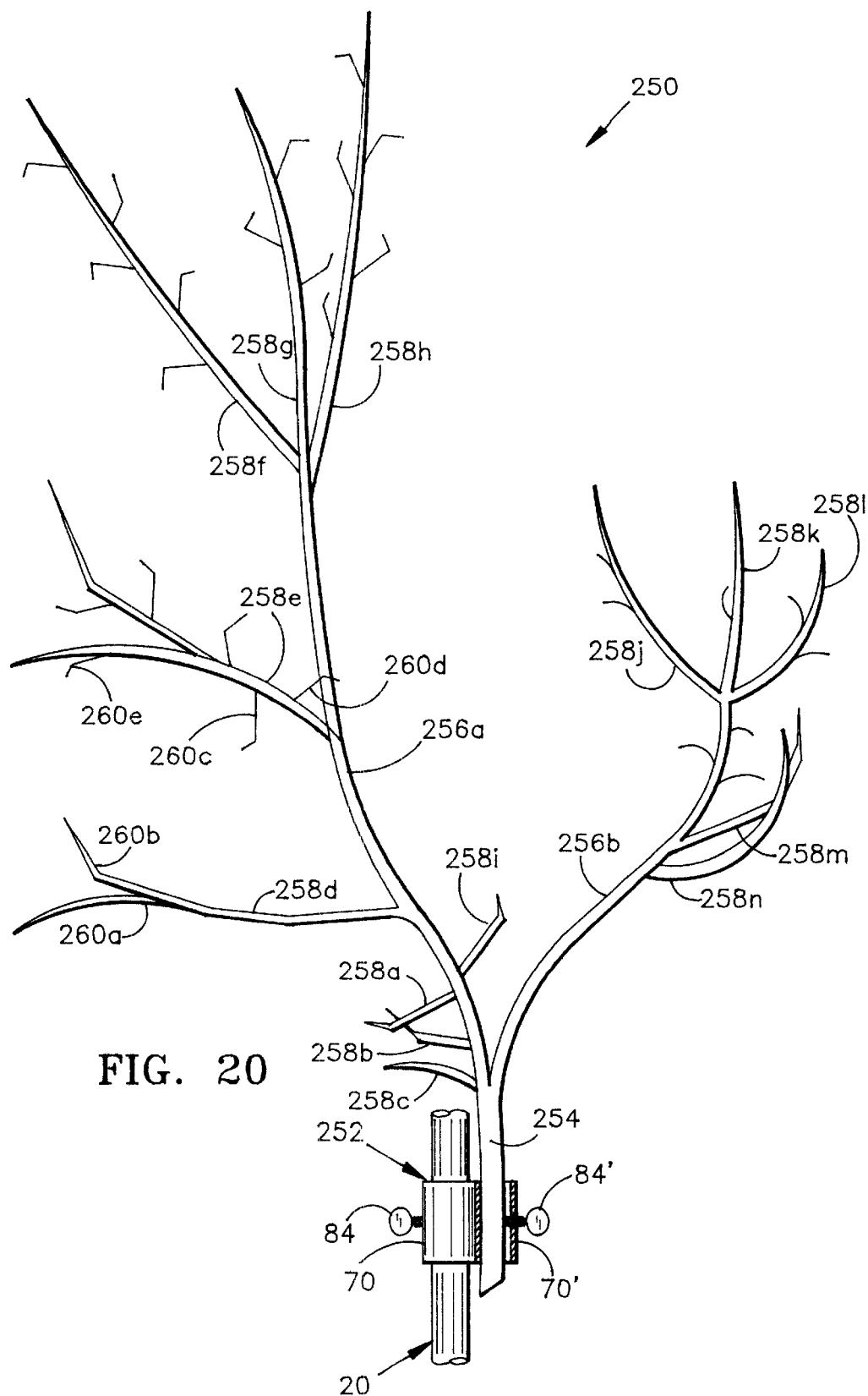
FIG. 20 is a front elevation view of a portion of a modular birding pole system incorporating a vertical branch module with showing a figure eight pole sleeve in partial section.

FIG. 20 shows a vertical branch module 250. Vertical branch module 250 is designed to enable the user to attach a small tree branch 254 to the birding pole 10 to provide a perch for birds on the pole. Vertical branch module 250 includes a figure-eight shaped pole sleeve 252 and a tree branch 254 that is received by one of the sleeves. Figure eight pole sleeve 252 is simply two pole sleeves welded together at their outwardly-facing, cylindrical surface 74, so that the axes of the two sleeves are parallel. This configuration allows one pole sleeve 70 to couple to pole extension module 20 and the other pole sleeve 70 to interiorly receive the tree branch 254. Alternately, the two pole sleeves can be welded to each other such that their axes are not parallel, but rather angled with respect to each other, so that the branch 254 received by one of the sleeves is held at an angle relative to the vertical pole, such as an angle of between about 20° and 70°. Preferably, the branch receiving pole sleeve has a diameter of between about 0.375 and 1.25 inches so that it will be sized for receiving a branch of a size appropriate for functioning well with the modular birding pole 10.

Preferably branch 254 divides into a plurality of finger branches 256a, 256b which then further divide into secondary finger branches 258a–n to provide a large number of perching surfaces having different diameters. The branch 254 may also further divide into tertiary finger branches, 260a–e for example.

Figure 21:
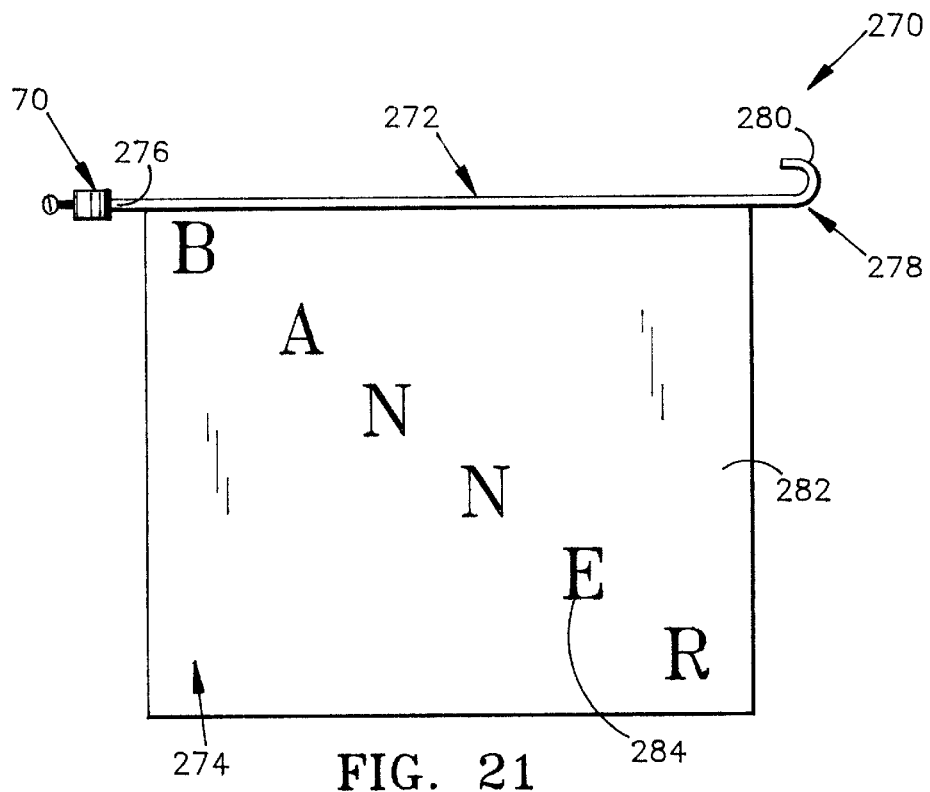
FIG. 21 is a perspective view of a banner module.

FIG. 21 shows a banner module 270 that includes a pole sleeve 70, a banner rod 272 and a banner 274. The proximal end 276 of rod 272 is welded to the radially, outwardly-facing pole sleeve surface 74. The distal end 278 of banner rod 272 has an upturned hook portion 280 to help prevent the banner 274 from becoming disengaged from the banner rod 272.

Banner 274 is made of any material customarily used for signs. Examples are cloth, canvas, wood, plastic or metal. Banner 274 can be fixably secured to rod 272 such as to welding. Alternately, banner 274 can have a sleeve-like pocket at the top to accept rod 272 or a series of rings which slide over rod 272. The front surface 282 and possibly back surface of banner 274 contain a text and/or graphic message 284.

C. Cap Modules

The male portion 52 of the last pole extension module 20 should have a cap to prevent rain water from entering the interior of pole extension module 20. Because the top of modular birding pole 10 is a place of distinction several different cap modules have been developed to cap the last pole extension module 20. For example, FIGS. 18 and 19 show a bird house cap module 300.

All cap modules share one common element, the cap 302. Cap 302 has a female portion 304 for coupling to male portion 52 of pole extension module 20. Female portion 304 is identical to female portion 54 of pole extension module 20. Cap 302 is closed at its distal end 306 unless otherwise stated. It should be noted that cap 302 could be open at its distal end 306 if another member of bird house cap module 300 was positioned above cap 302, as such an arrangement would still prohibit rain water from entering the interior of cap 302.

Along with cap 302, bird house module 300 includes a plate 304, bird house 306, (or alternately a bird feeder) and four screws 305a–d for fastening plate 304 to bird house 306. Bird house 306 can be any standard or custom bird house. Surface 308 of plate 304 is welded to the outwardly-facing, cylindrical surface 307 of cap 302. Plate 304 has four apertures (not shown) formed in surface 308 and extending entirely through plate 304. The apertures (not shown) each receive one screw 305 for securing bird house 306 to plate 304.

Figure 22:
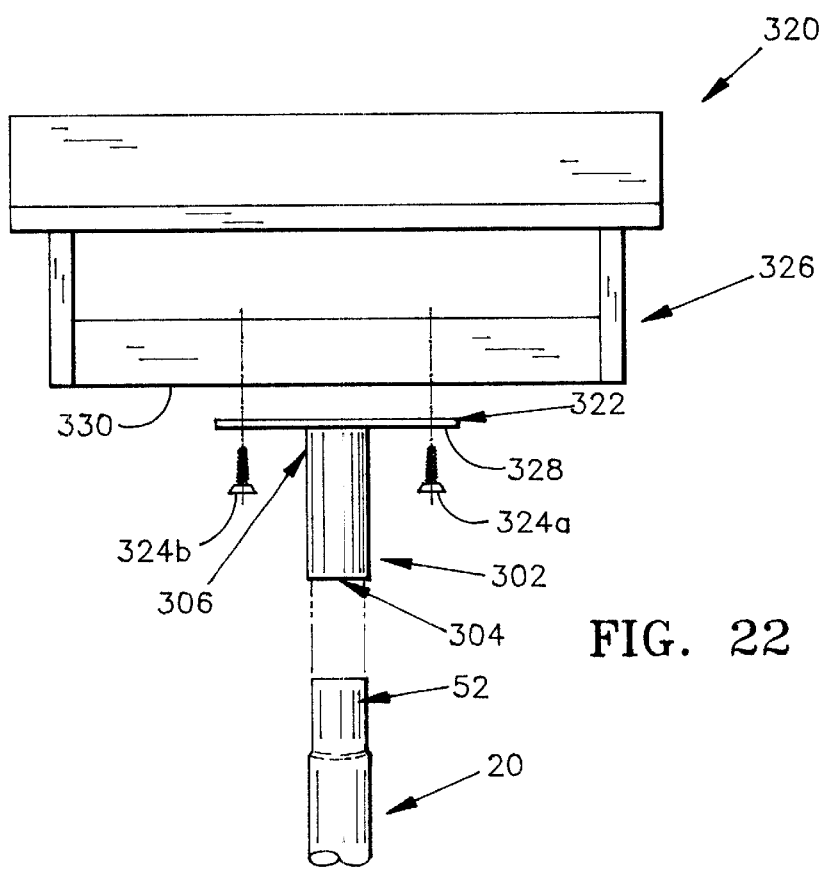
FIG. 22 is a front elevation view of a birding pole cap module.

FIG. 22 shows an example of a birding pole module 320. Birding pole module 320 includes cap 302, bracket 322, screws 324 and a house motif pole 326.

Cap 302 has a female portion 304 at its proximal end, and is welded to surface 328 of bracket 322 at its distal end 306. Bracket 322 has a plurality of apertures (not shown) formed in surface 328 and extending entirely through bracket 322. Each of the bracket apertures receives a screw 324 for securing a lower surface 330 of birding pole 326 to bracket 322.

FIG. 23 shows an example of a removable bird feeder module 350. Removable bird feeder module 350 includes a cap 302, a threaded lock washer 352 and a bird feeder 354. Cap 302 has a female portion 304 for receiving male portion 52 of pole extension module 20. The distal end 306 of cap 302 has a threaded surface 356.

Bird feeder 354 has a threaded aperture 358 formed in its bottom surface 360. Threaded aperture 358 can accept threaded male end portion surface 356 to secure bird feeder 354 to cap 302. Threaded lock washer 352 should be threaded onto threaded surface 356 before threaded aperture 358. Washer 352 is then positioned such that it rests against bottom surface 360 of feeder 354 when assembled to help prevent the feeder 354 from becoming un-threaded and thereby fall off.

FIG. 24 shows an example of a statue cap module 26. Statue module 26 includes a cap 302 and a statue member 400. Cap 302 has a female portion 304 to receive male portion 52 of pole extension module 20. Distal end 306 of cap 302 is closed and includes a mounting surface 402. Statue member 400 is fixedly secured to mounting surface 402. In FIG. 24, statue member 400 is a bird whose feet 404 are secured to mounting surface 402.

Statue member 400 can be any aesthetically pleasing shape and is not limited to the bird shown in FIG. 24. For example, statue member 400 could comprise a mechanical assembly with moving components, such as a pinwheel.

Figure 25:
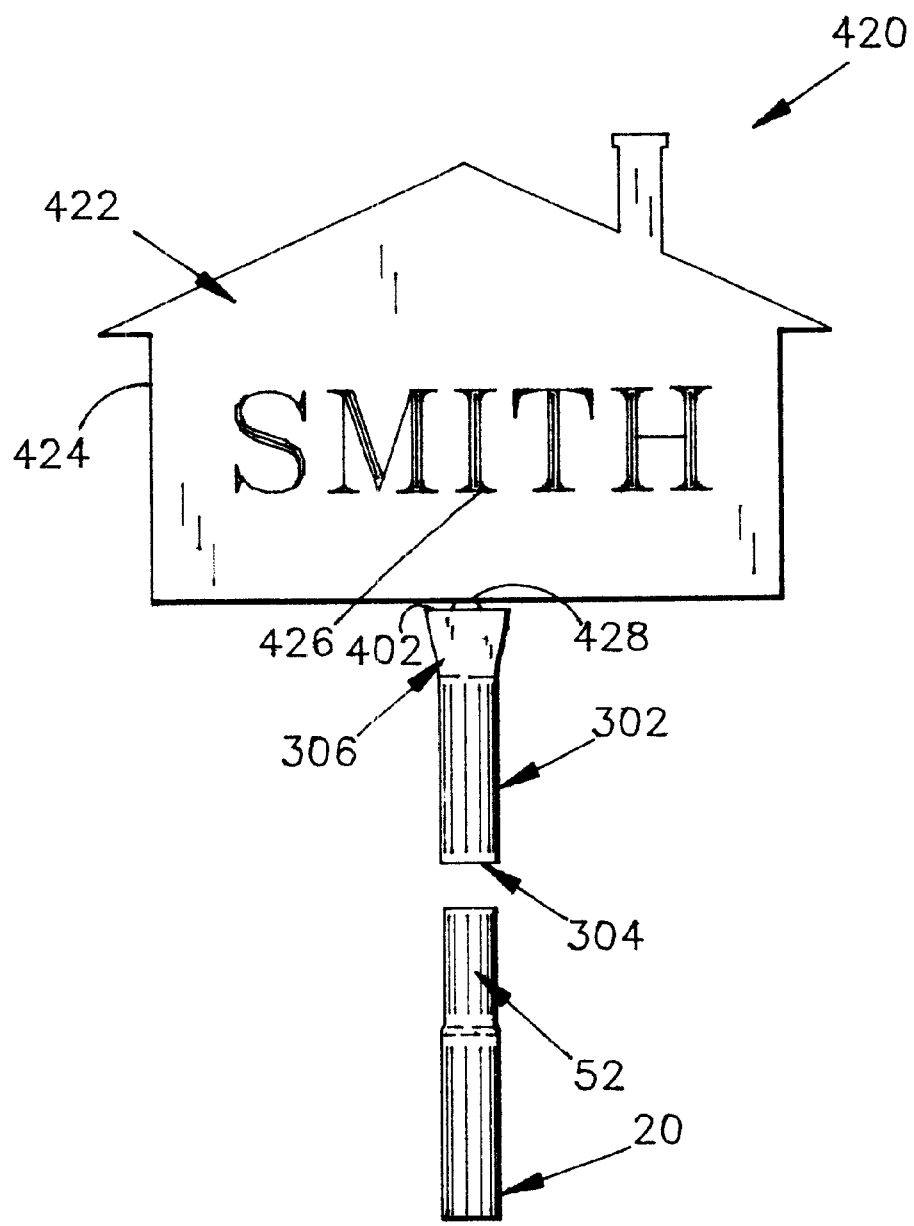
FIG. 25 is a front elevation view of a sign cap module.

FIG. 25 shows a sign module 420, that is a specialized example of a statue module 26. Sign module 420 is identical to statue module 26 except that statue member 400 has been replaced by sign member 422. Sign member 422 is shown in FIG. 25 as a house silhouette 424 with a text message 426. Sign member 422 can be any conceivable shape and contain any graphics or text desired. Sign member 422 in FIG. 25 has a post 428 extending from house silhouette 424 that is fixedly secured, by welding to cap mounting surface 402.

FIGS. 26 and 27 show an example of a bird bath module 500. Bird bath module 500 includes a cap 302, a bath holder 502 and a bird bath 504. Cap 302 has a female portion 304 to receive male portion 52 of pole extension module 20. The distal end 306 of cap 302 is open.

Bath holder 502 has three circular bars 506a–c extending outward from cap surface 508 near distal end 306 of cap 302. Bars 506 are equally spaced around cap 302 (i.e. 120° apart). The number of bars can be as low as two or greater than three as well. The distal ends 510a–c of bars 506a–c are generally vertical while the proximal ends 512a–c are generally horizontal. This gives bars 506a–c an L-shaped appearance.

A support ring 514 is fixedly secured (welded) to distal ends 510a–c of bars 506a–c. Support ring 514 has a circular cross section and is used to support the outer portion of bath 504.

Each bar 506 has a decorative bar 516 disposed below bar 506 and welded to cap 302 and to bar 506. Decorative bar 516 increases the aesthetic appeal of bird bath module 500 and provides additional support for distal ends 510a–c of bars 506a–c.

Bath 504 has a pie pan shape and includes a bottom portion 520, a wall portion 522 and a rolled edge portion 524. Bottom portion 520 includes a downwardly-facing surface 526 having ribs 528 and an upwardly-facing surface 530. Wall portion 522 has an inwardly-facing surface 532 and an outwardly-facing surface 533. Rolled edge 524 has a downwardly-facing surface 534 and an upwardly-facing surface 536.

Bath 504 is held in place by bath holder 502. Ribs 528 rests on the horizontal proximal ends 512a–c of bars 506a–c. Downward-facing rolled edge surface 534 overlaps the support ring 514 with the lip of the rolled edge surface 534 being disposed radially outwardly of the support ring 514 to hold the bath 504 on the support ring 514. Once in place, the interior of bath 504, defined by upward-facing surface 530 and inwardly-facing surface 532 can be filled with water. It should be noted that the presence of bath 504 above cap 302 keeps rain water from entering the interior of cap 302.

A simplified bird bath module 950 is shown in FIG. 34. The bird bath module 950 of FIG. 34 is implemented as an attachment module. In particular, the bird bath module 950 includes a support ring 954 similar to support ring 514 of FIGS. 26 and 27 that is welded or otherwise fixedly secured to surface 74 of pole sleeve 70 via connection member 956. In general, the support ring 954 has a circular cross section and is used to support the outer portion of bath 504.

Figure 28:
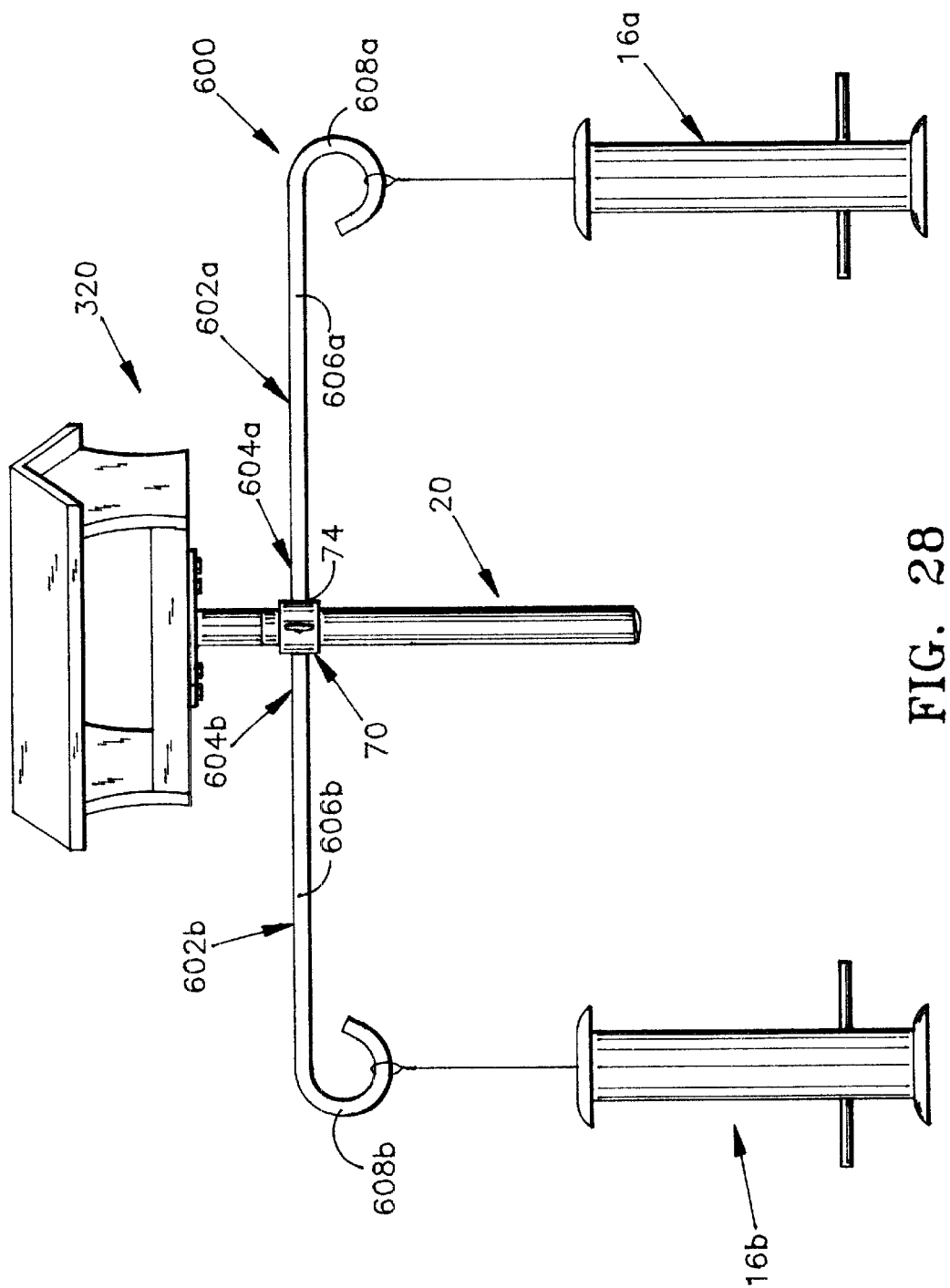
FIG. 28 is a side view of a birding pole module attached to a pole extension module.

FIG. 28 shows an example of birding pole module 320 attached to pole extension module 20. A dual linear hook module 600 is also shown attached to pole extension module 20. Dual linear hook module 600 includes a pole sleeve 70 and two hooks 602a,b, whose distal ends 604a,b are welded to surface 74 of pole sleeve 70.

Hooks 602a,b have a generally linear portion 606a,b and a curved hook portion 608a,b. The cross section of hooks 602a,b is circular. Different articles can be attached to hook portions 608a,b. In FIG. 28, two poles 16a,b are attached to hook portions 608a,b.

Although the invention has been described in detail with reference to certain preferred embodiments, variations and modifications exist within the scope and spirit of the present invention.

What is claimed is:

1. A modular pole for birding accessories, comprising:
   a first pole segment member comprising an upper end portion and a lower end portion, said first pole segment member operable to support birding accessories coupled thereto;
   an auger coupled to said first pole segment member, said auger comprising threads that secure said first pole segment member to ground in response said first pole segment member being rotated while said auger is in contact with an upper surface of the ground; and
   a stabilization module comprising
      a first pole sleeve operable to couple said stabilization module to said first pole segment member in a slidable manner that permits adjustable positioning upon said first pole segment member, and
      a plurality of stabilizing arms extending outwardly from said pole sleeve, each arm of said plurality of stabilizing arms comprising a first end that is coupled to said first pole sleeve and a second end that extends downwardly, said second end operable to extend below said upper surface of the ground in response to a downward force applied to said stabilization module.

2. The modular pole of claim 1, further comprising a shepherd's hook module comprising:
   a second pole segment member configured to detachably couple to said upper end portion of said first pole segment member, and
   at least one shepherd's hook permanently affixed to said second pole segment member.

3. The modular pole of claim 1, further comprising a linear hook module comprising:
   a second pole segment member configured to detachably couple to said upper end portion of said first pole segment member, and
   a hook comprising
      a generally linear portion permanently affixed to said second pole segment member such that said generally linear portion extends outwardly from said second pole segment member, and
      a curved hook portion that extends from a distal end portion of said generally linear portion of said hook.

4. The modular pole of claim 1, further comprising a dish module comprising:
   a second pole segment member configured to detachably couple to said upper end portion of said first pole segment member;
   a dish comprising an upper tier and a lower tier that define an interior cavity,
      said upper tier comprising an upper lip and a generally horizontal bottom surface that couples said upper tier to said lower tier, and
      said lower tier comprising a generally horizontally disposed bottom surface that defines a bottom portion of said interior cavity; and
   a dish holder affixed to said second pole segment member, said dish holder comprising a first support rod coupled to said second pole segment member and a second support rod coupled to said second pole segment member,
      said first support rod comprising a first generally horizontal portion, a first generally vertical portion, and a first hook portion disposed atop said first generally vertical portion, and
      said second support rod comprising a second generally horizontal portion, a second generally vertical portion, and a second hook portion disposed atop said second generally vertical portion,
      said first generally horizontal portion and said second generally horizontal portion operable to vertically support said dish via said generally horizontal bottom surface of said upper tier of said dish, and
      said first hook portion and said second hook portion operable to horizontally secure said dish by wrapping over said upper lip of said dish.

5. The modular pole of claim 1, further comprising:
   a second pole segment member configured to detachably couple to said upper end portion of said first pole segment member, and
   a dish module comprising
      a second pole sleeve configured to couple to said second pole segment member in a manner that permits adjustable positioning upon said second pole segment member;
      a dish comprising an upper tier and a lower tier that define an interior cavity,
         said upper tier comprising an upper lip and a generally horizontal bottom surface that couples said upper tier to said lower tier, and
         said lower tier comprising a generally horizontally disposed bottom surface that defines a bottom portion of said interior cavity; and
      a dish holder comprising a first support rod coupled to said second pole sleeve and a second support rod coupled to said second pole sleeve,
         said first support rod comprising a first generally horizontal portion, a first generally vertical portion, and a first hook portion disposed atop said first generally vertical portion;
         said first generally horizontal portion operable to vertically support said dish via said generally horizontal bottom surface of said upper tier of said dish, and said first hook portion operable to horizontally secure said dish by wrapping over said upper lip of said dish.

6. The modular pole of claim 1, further comprising a branch with leaves module comprising:
   a second pole sleeve configured to couple to said first pole segment member in a manner that permits adjustable positioning upon said first pole segment member,
   a first rod that extends outwardly from said second pole sleeve in order to define a main branch;
   a plurality of rods coupled to said first rod in order to define a plurality of finger branches, and
   a plurality of leaves coupled to said plurality of rods.

7. The modular pole of claim 1, further comprising a suet cage module comprising:
   a second pole sleeve configured to couple to said first pole segment member in a manner that permits adjustable positioning upon said first pole segment member,
   a cage to hold suet cakes, and
   a coupling member operable to secure said cage to said second pole sleeve.

8. The modular pole of claim 1, further comprising a suet cage module comprising:
   a second pole segment member configured to detachably couple to said upper end portion of said first pole segment member;
   a cage to hold suet cakes; and
   a coupling member affixed to said second pole segment member, said coupling member operable to secure said cage to said second pole segment member.

9. The modular pole of claim 1, further comprising a second pole sleeve comprising:
   a first aperture sized to permit adjustable positioning upon said first pole segment member, and
   a second aperture sized to permit detachable coupling of a birding accessory to said second pole sleeve.

10. The modular pole of claim 1, further comprising a statue cap module for inhibiting rain water from entering an interior of the modular pole, said cap module comprising:
   a second pole segment member configured to detachably couple to said upper end portion of said first pole segment member; and
   a statue member fixably secured to said second pole segment member.

11. The modular pole of claim 1, further comprising a sign cap module for inhibiting rain water from entering an interior of the modular pole, said sign cap module comprising:
   a second pole segment member configured to detachably couple to said upper end portion of said first pole segment member; and
   a sign member fixably secured to said second pole segment member.

12. The modular pole of claim 1, further comprising a bird bath cap module for inhibiting rain water from entering an interior of the modular pole, said bird bath cap module comprising:
   a second pole segment member configured to detachably couple to said upper end portion of said first pole segment member;

a plurality of bars extending radially outward from said second pole segment member;

a support ring fixedly secured to distal ends of said plurality of bars; and a bath comprising a bottom portion that rests upon said plurality of bars and a rolled edge surface the overlaps said support ring.

13. The modular pole of claim 1, further comprising a bird bath holder module comprising:

a second pole sleeve configured to couple to said first pole segment member in a manner that permits adjustable positioning upon said first pole segment member, and a support ring fixedly secured to said second pole sleeve, said support ring sized to engage and support a bird bath via a rolled edge surface of said bird bath.

14. The modular pole of claim 1, further comprising an adapter module comprising:

a lower end portion configured to detachably couple to said upper end portion of said first pole segment member, and at least two upper end portions fixedly attached to said lower end portion and each configured to detachable receive a lower end portion of a pole segment member of another module.

15. The modular pole of claim 1, further comprising an extended arm module comprising:

a second pole segment member configured to detachably couple to said upper end portion of said first pole segment member, and an arm permanently affixed to said second pole segment member such that said arm extends radially outward and upward from said second pole segment member, said arm comprising a hook portion at a distal end of said arm.

16. The modular pole of claim 1, further comprising a flanged arm module comprising:

a second pole segment member configured to detachably couple to said upper end portion of said first pole segment member, an arm permanently affixed to said second pole segment member such that said arm extends radially outward and upward from said second pole segment member, and a flange affixed to a distal end of said arm, said flange comprising an upper surface and a plurality of holes therethrough which enable birding accessories to be mounted to said upper surface of said flange.

17. A modular pole for birding accessories, comprising:

a first pole segment member comprising an upper end portion and a lower end portion, said first pole segment member operable to support birding accessories coupled thereto; and a stabilization module comprising
a first pole sleeve operable to couple said stabilization module to said first pole segment member in a slidable manner that permits adjustable positioning upon said first pole segment member, and
a plurality of stabilizing arms extending outwardly from said pole sleeve, each arm of said plurality of stabilizing arms comprising a first end that is coupled to said first pole sleeve and a second end that extends downwardly, said second end operable to extend below said upper surface of the ground in response to a downward force applied to said stabilization module.

18. The modular pole of claim 17, wherein the stabilization module includes a ground engaging auger having an outwardly-facing cylindrical surface and a single rod that is wrapped around and affixed to the outwardly facing-cylindrical surface.

19. The modular pole of claim 17, wherein said plurality of stabilizing arms comprises at least two stabilizing arms that extend outwardly from said first pole sleeve such that said at least two stabilizing arms are non-collinear to one another.

20. The modular pole of claim 17, wherein said plurality of stabilizing arms comprises four stabilizing arms, each stabilizing arm of said four stabilizing arms comprising an L-shaped rod that
is welded to said first pole sleeve at said first end of said each stabilizing arm, and extends downwardly at said second end of said each stabilizing arm.

21. The modular pole of claim 17, wherein said plurality of stabilizing arms comprises:

a first L-shaped rod that
is welded to said first pole sleeve at said first end of a first stabilizing arm of said plurality of stabilizing arms, and
extends downwardly at said second end of said first stabilizing arm, a second L-shaped rod that
is welded to said first pole sleeve at said first end of a second stabilizing arm of said plurality of stabilizing arms such that said second L-shaped rod is collinear with said first L-shaped rod, and
extends downwardly at said second end of said second stabilizing arm, a third L-shaped rod that
is welded to said first pole sleeve at said first end of a third stabilizing arm of said plurality of stabilizing arms such that said third L-shaped rod is perpendicular to said first L-shaped rod, and
extends downwardly at said second end of said third stabilizing arm, and a fourth L-shaped rod that
is welded to said first pole sleeve at said first end of a fourth stabilizing arm of said plurality of stabilizing arms such that said fourth L-shaped rod is collinear with said third L-shaped rod, and
extends downwardly at said second end of said second stabilizing arm.

22. A modular pole for birding accessories, comprising:

a first pole segment member comprising an upper end portion operable to receive birding accessories and a lower end portion operable to mount said first pole segment to ground, said first pole segment member operable to support birding accessories coupled thereto; and a second pole sleeve comprising
a first aperture sized to permit adjustable positioning upon said first pole segment member, and
a second aperture sized to permit detachable coupling of a birding accessory to said second pole sleeve.

23. The modular pole of claim 22, wherein said first aperture has a first aperture axis, and said second aperture has a second aperture axis, the first aperture axis being disposed at a non-parallel angle to the second aperture axis, wherein the second aperture is sized for receiving a natural branch.

24. The modular pole of claim 23 wherein the second aperture axis is offset from the first aperture axis between about 20° and 70°; and the second aperture has a diameter of between about 0.375 inches and about 1.25 inches.

25. The modular pole of claim 22 wherein said first aperture has a first aperture axis and said second aperture has a second aperture axis, the first aperture axis being generally parallel to the second aperture axis.

26. A dish module for dispensing consumable products to wild birds, comprising:
   a dish comprising an upper tier and a lower tier that define an interior cavity,
      said upper tier comprising an upper lip and a generally horizontal bottom surface that couples said upper tier to said lower tier, and
      said lower tier comprising a generally horizontally disposed bottom surface that defines a bottom portion of said interior cavity; and
   a dish holder comprising a first support rod and a second support rod coupled to a first surface of a support bar comprising at least two apertures that extend through said first surface and a second surface of said support bar,
      said first support rod comprising a first generally horizontal portion, a first generally vertical portion, and a first hook portion disposed atop said first generally vertical portion, and
      said second support rod comprising a second generally horizontal portion, a second generally vertical portion, and a second hook portion disposed atop said second generally vertical portion,
      said first generally horizontal portion and said second generally horizontal portion operable to vertically support said dish via said generally horizontal bottom surface of said upper tier of said dish, and
      said first hook portion and said second hook portion operable to horizontally secure said dish by wrapping over said upper lip of said dish.

27. For use with a modular birding accessory pole, a dish module for dispensing consumable products to wild birds comprising:
   a pole sleeve configured to couple to said modular birding accessory pole in a manner that permits adjustable positioning upon said modular birding accessory pole;
   a dish comprising an upper tier and a lower tier that define an interior cavity,
      said upper tier comprising an upper lip and a generally horizontal bottom surface that couples said upper tier to said lower tier, and
      said lower tier comprising a generally horizontally disposed bottom surface that defines a bottom portion of said interior cavity; and
   a dish holder comprising a first support rod coupled to said second pole sleeve and a second support rod coupled to said second pole sleeve,
      said first support rod comprising a first generally horizontal portion, a first generally vertical portion, and a first hook portion disposed atop said first generally vertical portion, and
      said second support rod comprising a second generally horizontal portion, a second generally vertical portion, and a second hook portion disposed atop said second generally vertical portion,
      said first generally horizontal portion and said second generally horizontal portion operable to vertically support said dish via said generally horizontal bottom surface of said upper tier of said dish, and
      said first hook portion and said second hook portion operable to horizontally secure said dish by wrapping over said upper lip of said dish.

28. For use with a modular birding accessory pole comprising a first pole segment member having an upper end portion operable to receive birding accessories and a lower end portion operable to mount said modular birding accessory pole to ground, a branch with leaves module comprising:
   a second pole segment member configured to detachably couple to said upper end portion of said first pole segment member, and
   a first rod that extends outwardly from said second pole segment member in order to define a main branch;
   a plurality of rods coupled to said first rod in order to define a plurality of finger branches; and
   a plurality of leaves coupled to said plurality of rods.

29. For use with a modular birding accessory pole comprising at least one pole segment member, a suet cage module comprising:
   a second pole sleeve configured to couple to said modular birding accessory pole in a manner that permits adjustable positioning upon said modular birding accessory pole,
   a cage to hold suet cakes, and
   a coupling member operable to secure said cage to said second pole sleeve.

30. The suet cage module of claim 29, wherein the coupling member includes a first support rod and a second support rod coupled to a first surface of a support bar, each of the first and second support bars including a horizontal portion for vertically supporting an underside surface of the suet cage and a hook portion for horizontally securing the suet cage by wrapping over a bar of the suet cage.

31. A holder for holding a container having a bottom, a side and an upper surface of the side, the dish holder comprising a first support rod and a second support rod coupled to a support member,
   said first support rod comprising a first generally horizontal portion, a first generally vertical portion, and a first hook portion disposed atop said first generally vertical portion, and
   said second support rod comprising a second generally horizontal portion, a second generally vertical portion, and a second hook portion disposed atop said second generally vertical portion,
   said first generally horizontal portion and said second generally horizontal portion operable to vertically support said container via said bottom surface of said container, and
   said first hook portion and said second hook portion operable to horizontally secure said dish by wrapping over said top surface of the side.

32. The dish holder of claim 31 further comprising a sleeve member coupled to the support member, the sleeve member being sized and positioned for receiving a pole.

33. The dish holder of claim 32 wherein the support member includes an attachment portion for fixedly attaching the dish holder to a planar surface of a birding accessory.

* * * * *